US008114248B2

(12) United States Patent
Lee et al.

(10) Patent No.: US 8,114,248 B2
(45) Date of Patent: Feb. 14, 2012

(54) ROLL-TO-ROLL METHOD AND SYSTEM FOR MICRO-REPLICATION OF A PATTERN OF LARGE RELIEF THREE-DIMENSIONAL MICROSTRUCTURES

(75) Inventors: Kang Lee, Westminster, CA (US); Nanda Nathan, Huntington Beach, CA (US); Engin Arik, Thousand Oaks, CA (US); Thomas Forrester, Hacienda Heights, CA (US); Tomasz Jannson, Torrance, CA (US); Edward M. Kaiser, Redondo Beach, CA (US); Kevin H. Yu, Temple City, CA (US)

(73) Assignee: Asahi Kasei Kabushiki Kaisha, Osaka (JP)

( * ) Notice: Subject to any disclaimer, the term of this patent is extended or adjusted under 35 U.S.C. 154(b) by 134 days.

(21) Appl. No.: 11/649,428

(22) Filed: Jan. 3, 2007

(65) Prior Publication Data

US 2008/0156421 A1  Jul. 3, 2008

(51) Int. Cl.
  B29C 65/02   (2006.01)
  B29C 65/52   (2006.01)
  B29C 65/56   (2006.01)
  B32B 37/10   (2006.01)
  B32B 37/14   (2006.01)
  B32B 37/26   (2006.01)
  B32B 38/06   (2006.01)
  B32B 38/10   (2006.01)
  B29C 65/54   (2006.01)
  B32B 37/02   (2006.01)
  B32B 37/04   (2006.01)

(52) U.S. Cl. ............... 156/715; 156/289; 156/306.9; 156/714; 156/719

(58) Field of Classification Search .............. 156/344, 156/429, 446, 447, 531–534, 582, 714, 715, 156/289, 306.9, 719
See application file for complete search history.

(56) References Cited

U.S. PATENT DOCUMENTS 3,663,344 A * 5/1972 Brock et al. ............ 428/76
4,470,858 A * 9/1984 McMaster ............ 156/103
4,792,371 A * 12/1988 Miyota et al. ............ 156/211
(Continued)

Primary Examiner — Sonya Mazumdar
(74) Attorney, Agent, or Firm — Morgan, Lewis & Bockius LLP

(57) ABSTRACT

A method and system referred to as PALM (Patterning by Adhesive of Large Relief Three-Dimensional Microstructures) with large reliefs exceeding 1 µm and being as large as 100 µm. The microstructures can be either deterministic (such as microprisms), or random (such as diffusers), the first obtained by copying an original supermaster, and latter obtained by copying a laser speckle pattern. The master process entails copying a supermaster into the form of the microstructure constituting a pattern on the patterning cylinder (called a drum), to be then continuously multiplied in the PALM system, in a continuous roll-to-roll web process. The latter method, together with the related system, is the subject of this invention. The rolls continuously repeat the master pattern, copying by adhesive with large viscosity on acrylic (hybrid) as well as by a monolithic process. The monolithic process can be accomplished using temperature and pressure, or by UV-cured polymerization. Therefore, the invention comprises three alternative processes: one, hybrid (adhesive on acrylic), and two monolithic ones. In the PALM (hybrid) process, an epoxy is wet-coated on film substrates such as polycarbonate (PC), polyester (PET), (PE), or other flexible material. The adhesive, in liquid form, is applied to the substrate by a self-metered coating sub-process. In the present invention, the adhesive is used for forming the microstructure pattern. The microstructure pattern is replicated from a master roll or image drum onto a coating roll.

3 Claims, 21 Drawing Sheets

U.S. PATENT DOCUMENTS

| | | | |
|---|---|---|---|
| 4,978,565 A * | 12/1990 | Pigneul et al. | 428/156 |
| 5,116,548 A * | 5/1992 | Mallik et al. | 264/1.34 |
| 5,279,689 A * | 1/1994 | Shvartsman | 156/220 |
| 5,643,400 A * | 7/1997 | Bernard et al. | 156/500 |
| 5,700,535 A * | 12/1997 | Galsterer et al. | 428/40.1 |
| 6,120,636 A * | 9/2000 | Nilsen et al. | 156/230 |
| 6,242,510 B1 * | 6/2001 | Killey | 523/204 |
| 6,668,893 B2 * | 12/2003 | Hwang | 156/494 |
| 2003/0108710 A1 * | 6/2003 | Coyle et al. | 428/64.4 |
| 2005/0024754 A1 * | 2/2005 | Epstein et al. | 359/831 |
| 2006/0283539 A1 * | 12/2006 | Slafer | 156/230 |

* cited by examiner s = Pi * D * Teta/360
Web speed: 20 ft./min. ≈ 4 in./s s (typ.) = pi*6*$\frac{30}{360}$
= 1.57 in.
t = 0.4 s s = film wrap arc

ROLL-TO-ROLL METHOD AND SYSTEM FOR MICRO-REPLICATION OF A PATTERN OF LARGE RELIEF THREE-DIMENSIONAL MICROSTRUCTURES

BACKGROUND OF THE INVENTION

1. Field of the Invention

The present invention relates to the field of manufacturing by replication of a master pattern. More specifically, the invention relates to roll-to-roll replication of high aspect ratio three-dimensional microstructures from an image drum cylinder onto a continuous band of curable liquid adhesive in a process herein called PALM.

2. Background Art

In the present invention a liquid adhesive is applied, using a roll-to-roll technique to a drum having a microstructure pattern that is to be replicated onto a rolling flexible sheet or substrate. There are numerous prior art patents which disclose this type of replication process. By way of example, the assignee hereof has obtained U.S. Pat. Nos. 5,735,988 and 5,922,238 for replicating optical diffusers with shallow relief patterns. Others have disclosed similar replication processes for creating microcup patterns for manufacturing LCD displays. See for example U.S. Pat. Nos. 6,933,098; 6,930,818; and 6,672,921. There are also numerous issued U.S. Patents relating to roll-to-roll replication processes for fabricating retro-reflective sheeting and the like such as U.S. Pat. Nos. 5,763,049 and 5,691,846. However, such prior art relates generally to either relatively low profile, small relief patterns with structures having peak heights of less than about 5μ meters or to higher relief structures having very regular and thus highly predictable relief patterns.

However, there is a need for employing such low cost, high yield replication processes for fabricating deep relief, large profile, irregular optical surfaces such as large angle diffusers with no specular components and only diffuse components. It would be highly advantageous to provide a roll-to-roll microreplication system capable of fabricating accurate replications of patterns having relief structures from as small as 3μ meters to as large as 100μ meters.

SUMMARY OF THE INVENTION

The present invention comprises a method, system and device referred to as PALM (Patterning by Adhesive of Large Relief Three-Dimensional Microstructures) with large reliefs exceeding 1 μm and being as large as 100 μm. The PALM process is a web micropatterning process that replicates deep relief microstructures, both random and deterministic. These three-dimensional microstructures have resolving elements, d, down to the submicron range, but large RMS, up to 30 μm, or higher, with aspect ratios approaching, or exceeding unity (AR~1). They can be found in two-dimensional arrays (microprisms) and three-dimensional arrays (microlenses). The microstructures can be either deterministic (such as microprisms), or random (such as diffusers), the first obtained by copying the original supermaster, and latter obtained by copying a laser speckle pattern. The processes of creating the master are not the subject of this invention. The master process entails copying a supermaster into the form of the microstructure constituting a pattern on the patterning cylinder (called a drum), to be then continuously multiplied in the PALM system, in a continuous roll-to-roll web process. The latter method, together with the related system, is the subject of this invention. By "large area microstructures," we mean the microstructure produced on rolls, one foot, two feet or more (60 cm or more) wide, and 1000 ft., 2000 ft. or more long. The rolls continuously repeat the master pattern, copying by adhesive epoxy with large viscosity on acrylic (hybrid) as well as by a monolithic process. The monolithic process can be accomplished using temperature and pressure, or by UV-cured polymerization. Therefore, we consider three kinds of processes: one, hybrid (adhesive on acrylic), and two monolithic ones. Typical structures are 36 in. (or 91 cm) wide.

In the PALM (hybrid) process, an adhesive is wet-coated on film substrates such as polycarbonate (PC), polyester (PET), (PE), or other flexible material, obtained from manufacturers such as DuPont, GE, or others. The adhesive, in liquid form, is applied to the substrate by a self-metered coating sub-process, analogous to lubrication. This is a type of electrohydrodynamic lubrication, which is a phenomenon that occurs when a lubricant (here adhesive) is introduced between surfaces which are in rolling contact. In mechanical design literature (Mechanical Engineering Design by Shipley et al, $4^{th}$ Ed., Section 12-4), such lubrication is introduced for motoring force transfer in a mating press, or rolling bearing, or other, to avoid boundary lubrication. In the present invention, the adhesive (a lubricant) is used for forming the microstructure pattern. The microstructure pattern is transferred (replicated) from a master roll (a drum) onto a coating roll. The general architecture of the PALM process is shown in FIG. 1. The unwind roll containing substrate is transformed, through the PALM process, into a re-wind roll containing a substrate with coated adhesive, including a replicated microstructure pattern. Typically, optical adhesive, which must be transparent to light, (especially, in solid form) and have desired optical properties, such as a refractive index, which should typically have a value close to that of the substrate, is used for providing optical contact (without air gap) between two optical layers. Here, in addition to the above property, it should have the ability to follow the analog master micropattern, as well as other properties such as high viscosity and proper surface energy, discussed below. By "analog" structure, we mean that in the ideal case, the three-dimensional master relief pattern should be precisely replicated into the three-dimensional copy. This is a challenge, especially for relief microstructures approaching 100 μm (or 4 mil), not only with micro or sub-micro resolution details, d, and with aspect ratio, (AR), approaching, or exceeding 1-3 range up to 50 μm, or even higher, where, here the aspect ratio is defined as ratio of root mean square (RMS), δ, into resolution detail, d, as shown in FIG. 2, for a random microstructure:

$$(AR)^\Delta = \frac{\delta}{d} \tag{1}$$

where $$\delta = \text{RMS} = \sqrt{\langle (z-z_0)^2 \rangle} \tag{2}$$

where $\langle \ldots \rangle$ is ensemble average, as defined in statistical optics literature, and the coordinate $z_0$, is defined in such a way that $$\langle z - z_0 \rangle = 0 \tag{3}$$

The two-dimensional version of random pattern is shown in FIG. 2. This figure is only for simplification since the real random pattern is three-dimensional, as in FIG. 5. In typical scattering modeling theories, the resolving element, d, is replaced by correlation length ξ, discussed in X-ray scattering for rough surfaces. By applying so-called ergodic hypothesis, the ensemble average can be replaced by integration over single statistical realization, in the form:

$$\langle (z-z_0)^2 \rangle = \lim_{\Delta x \to \infty} \frac{1}{\Delta x} \int_{-\Delta x/2}^{\Delta x/2} (z-z_0)^2 dx \qquad (4)$$

where z(x) is a function shown in FIG. 2. These definitions can be also applied for the deterministic (regular) patterns such as microprism array, as in FIG. 3, or other regular repeatable relief patterns, with two-dimensional arrays (microprisms), or three-dimensional arrays (microlenses).

The microprisms patterns can be used as Directional Turning Films (DTFs), Brightness Enhancing Films (BEFs), and the like. The random structures can be Lambertian or non-Lambertian diffusers. In general, in the case of analog microstructures as discussed above, we should avoid sharp edges, marked by circles in FIGS. 2 and 3. Nevertheless, the PALM process can be optimized to replicate minimum radius of curvature of such sharp edges. It should be noted that in some cases, such as enhanced BEFs (as those produced by 3M), some finite (not zero) radius of curvature is advantageous, as that shown in FIG. 4. These structures can also be replicable in three-dimensional arrays, resembling lens arrays.

FIGS. 5 and 6 provide SEM (Scanning Electron Microscope) microphotographs of typical non-Lambertian diffusers, produced by the PALM. In FIG. 5, the circular diffusers are shown for various values of HMFW (Half-Maximum Full Width) angle. In FIG. 6, the elliptical diffusers are shown, with different values of the HMFW angle along perpendicular horizontal axes. Various versions of such diffusers are producible by the PALM process. Preferably, the major axis of elliptical microstructures is oriented on the image drum in a circumferential direction.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF PREFERRED EMBODIMENTS

General Operation of the PALM System
Hybrid PALM Process

Figure 7:
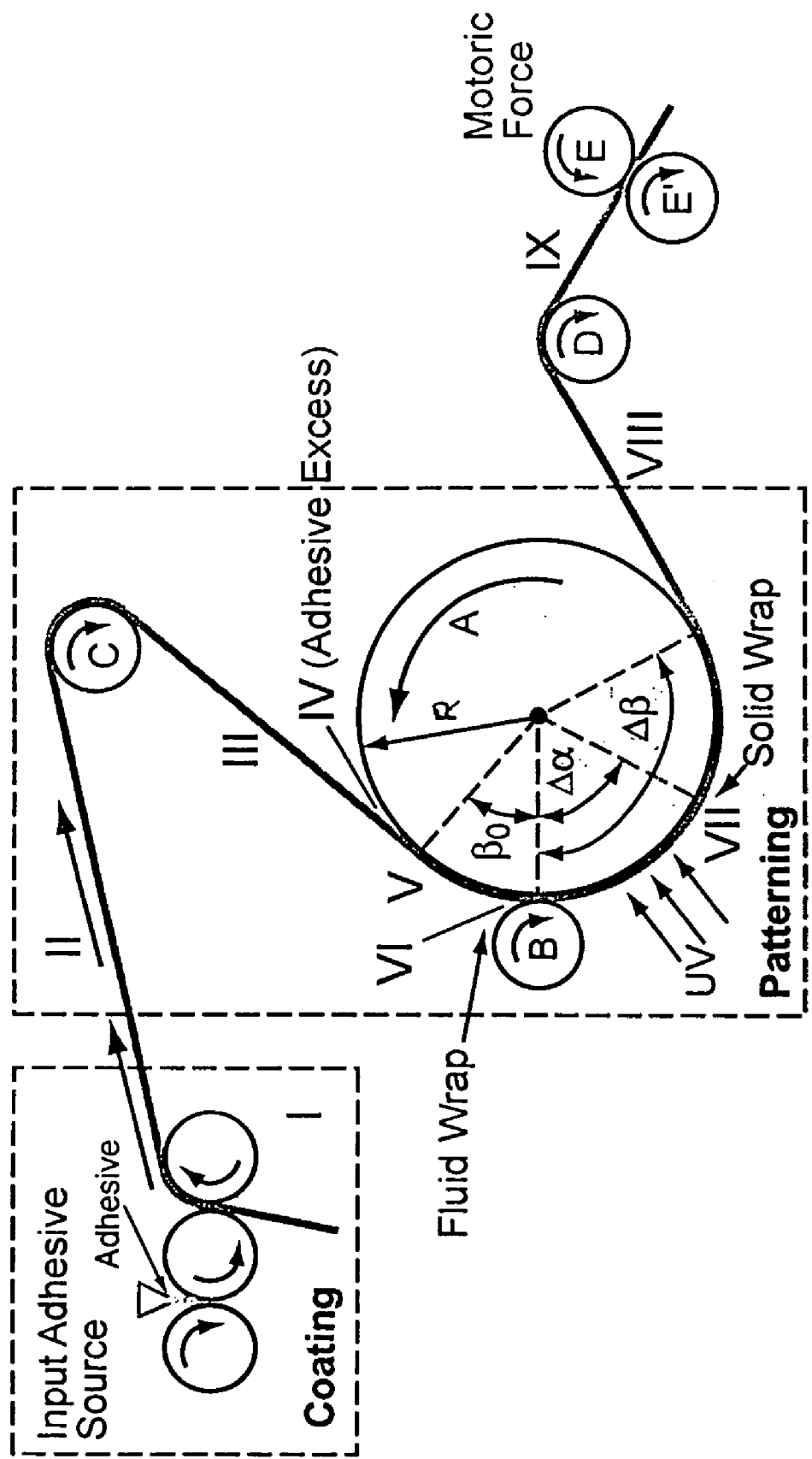
FIG. 7 is a two-dimensional projection (out of scale) of PALM device geometry, including two areas: coating and patterning, as well as process regions, denoted as I through IX.

The critical elements of the PALM device are shown in simplified form in FIG. 7. For the sake of simplicity we only show elements essential for functionality of the device. Two basic areas are shown: the coating area and the patterning area, the latter one being the subject of the invention. In the coating area, identified as Region I, the adhesive liquid (fluid) layer is coated on the continuous substrate band (or, film) with 3-4 mils thickness. This layer is about 30 μm thick and contains fluid adhesive at room temperature. It is then transferred through Region II into idler roll C, and then through Region III, until it approaches the self-metering puddle (Region IV), where it is introduced into contact with patterning or image drum A. Here, it is in a vortical mixing area (called the puddle or reservoir) where fluid adhesive is self-metered into Region V, and where adhesive fluid coupling occurs between the substrate film and patterning drum A. In Region V, the adhesive is still in liquid form. In this region, the substrate band is in contact (coupling) with drum A. In Region VI, the impression or nip roll B provides a nip force into drum A, in "kiss" (or pressure) contact form. Both nip force and wrap angle $\beta_0$ are sufficient to create fluid coupling between the substrate band and drum A, which has minimum internal friction force due to fluid coupling. The patterning drum A does not have its own driving force; it is driven only by solid (or semi-solid) fluid adhesive coupling with substantially the same angular velocity ω as roll B and the substrate band, in the range of 10 revolutions per min.

Figure 8:
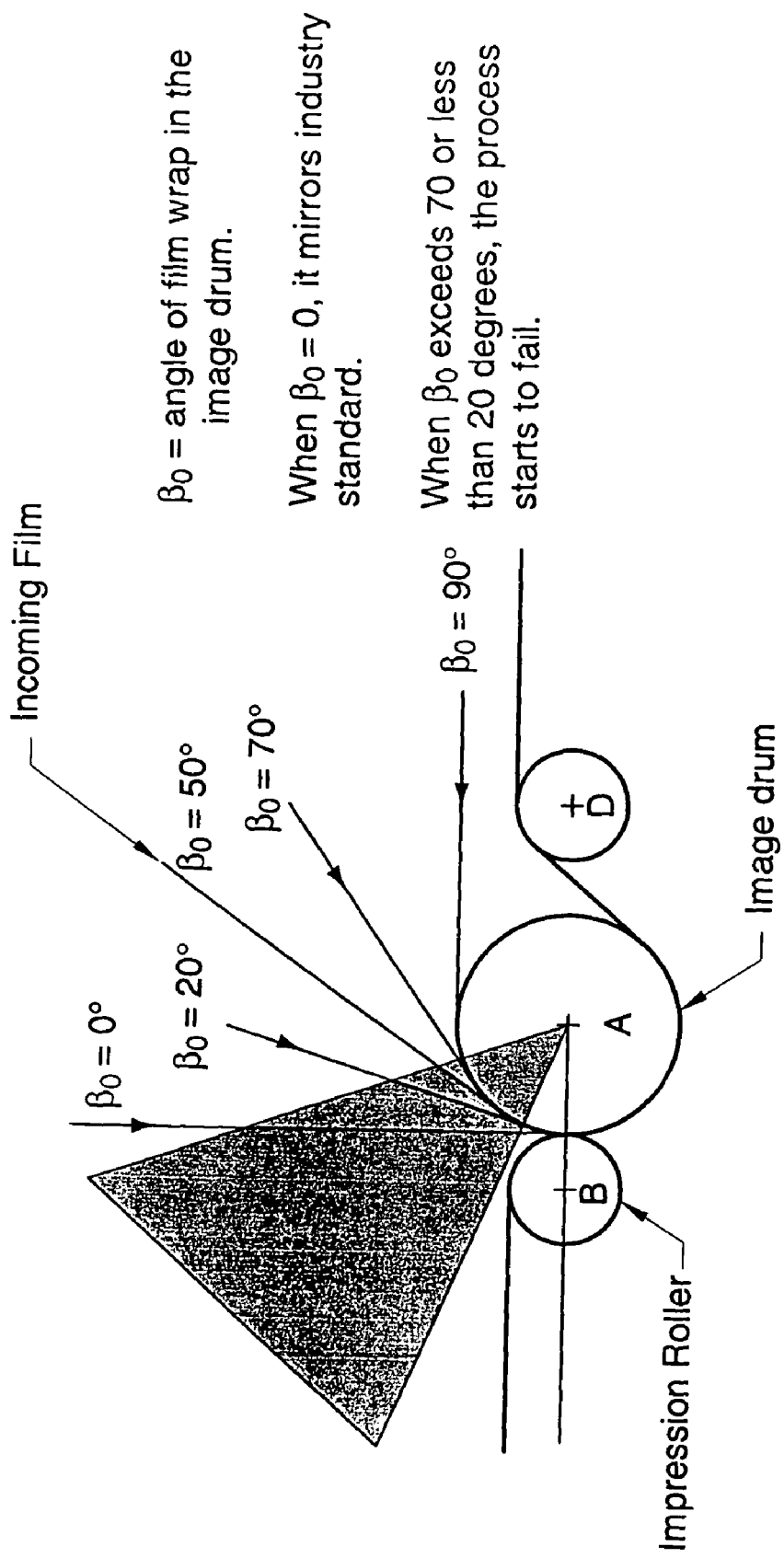
FIG. 8 is an illustration of different liquid wrap angles $\beta_0$.

Roll B also serves the additional function of blocking UV radiation from Region V. Therefore, at the same moment that a nip force acts on drum A, the UV radiation starts to cure the adhesive. The wrap angle value, $\beta_0$, is in the range of 5°-70° (FIG. 8). In Region VII, UV radiation operates with intensity of about 5-10 watts/cm². Since FIG. 7 is a two-dimensional projection of real PALM device geometry, the Region VII of UV exposure is an extended linear area, with size: $\Delta\alpha \cdot R \cdot l$, where R—radius of drum A, and l—its length (width). The $\Delta\alpha \cdot R$—value is 4 cm, for R=8 cm. In Region VII, the transformation (phase change) of liquid into solid adhesive occurs. After nip force contact, the substrate band is still in contact with drum A, through angle $\Delta\beta$, of about 90°. Then in Region VIII, the substrate band, including solid adhesive layer with replicated pattern, is transferred to roll D, and then, in Region IX, into double-roll E/E' that provides the motoric force into the patterning system. This force drives drum A through coupling Region VII.

Kinematics of the PALM Process

Figure 9:
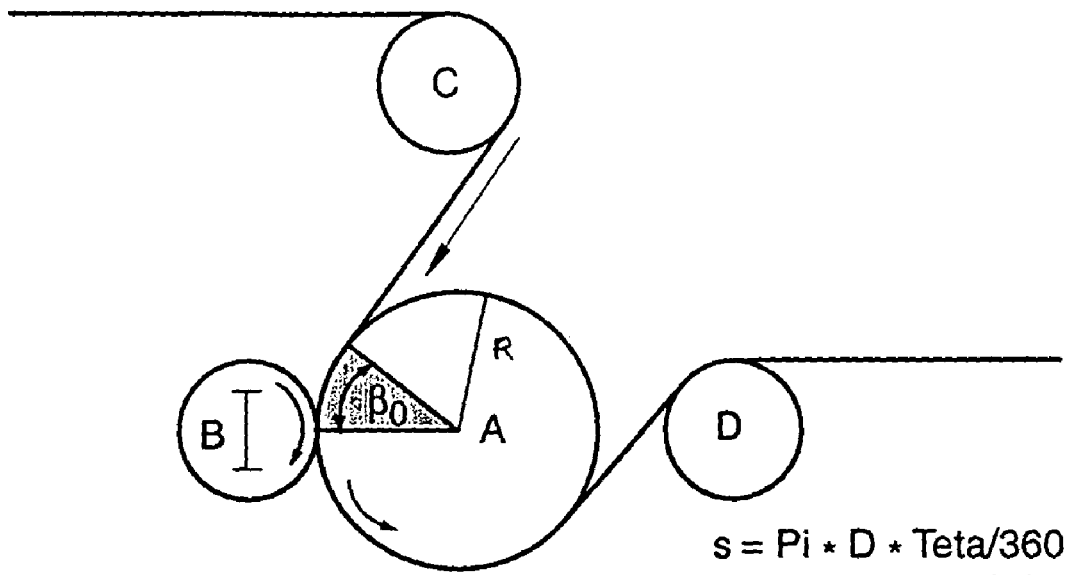
FIG. 9 is an illustration of the kinetics of the PALM process.
Figure 9:
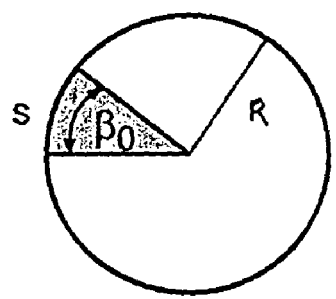

The kinematics of the PALM process is described in FIG. 9. The speed of the web band, V, is 20 ft./min., or 10 cm/s, as a reference, since it should be in this range, for self-metering stability. For roll A radius, R, equal to 10 cm, the angular speed $\omega$, of the roll A, is 1 rad/sec or 10 rpm (10 revolutions per minute). In order to calculate the time, t, when the adhesive is within the liquid wrap, with length, s, we assume a diameter of the roll A, D=2r=6 in., and a liquid wrap angle, $\beta_0$=30°, then, ($s \approx R\beta_0$), $$s = \pi D \frac{\beta_0}{360} = 1.57 \text{ in.} = 4 \text{ cm} \quad (5)$$

and, $$V = 20 \text{ ft./min.} = 4 \text{ in.}/s = 10 \text{ cm}/s \quad (6)$$

thus, the liquid wrap time, t, is $$t = \frac{s}{V} = \frac{4 \text{ cm}}{10 \text{ cm}/s} = 0.4 s \quad (7)$$

In another example, assuming: D=7 in., $\beta_0$=45°, we obtain t=0.7 s.

The typical effective width of the diffuser roll is 36 in., or 91 cm, approximately 1 m width for simplicity. The typical diffuser roll effective length is 2000 ft., or 600 m. Assuming the speed of the band: V=20 ft./min., the typical total time of the PALM process, T, is $$T = \frac{2000 \text{ ft.}}{20 \text{ ft./min.}} = 100 \text{ min.} \quad (8)$$

Assuming an effective roll width of 1 m, and a length of 600 m, and assuming a 16:9 digital format of a diffuser screen, we obtain the screen length of 178 cm, and the number of screens per roll is 337. This yields 2700 screens per day, assuming the two-shift (16 hr.) day operation; or 675,000 per year for a single machine, assuming 250 days per year of effective web operation.

General Characteristics of the PALM Process

Figure 10:
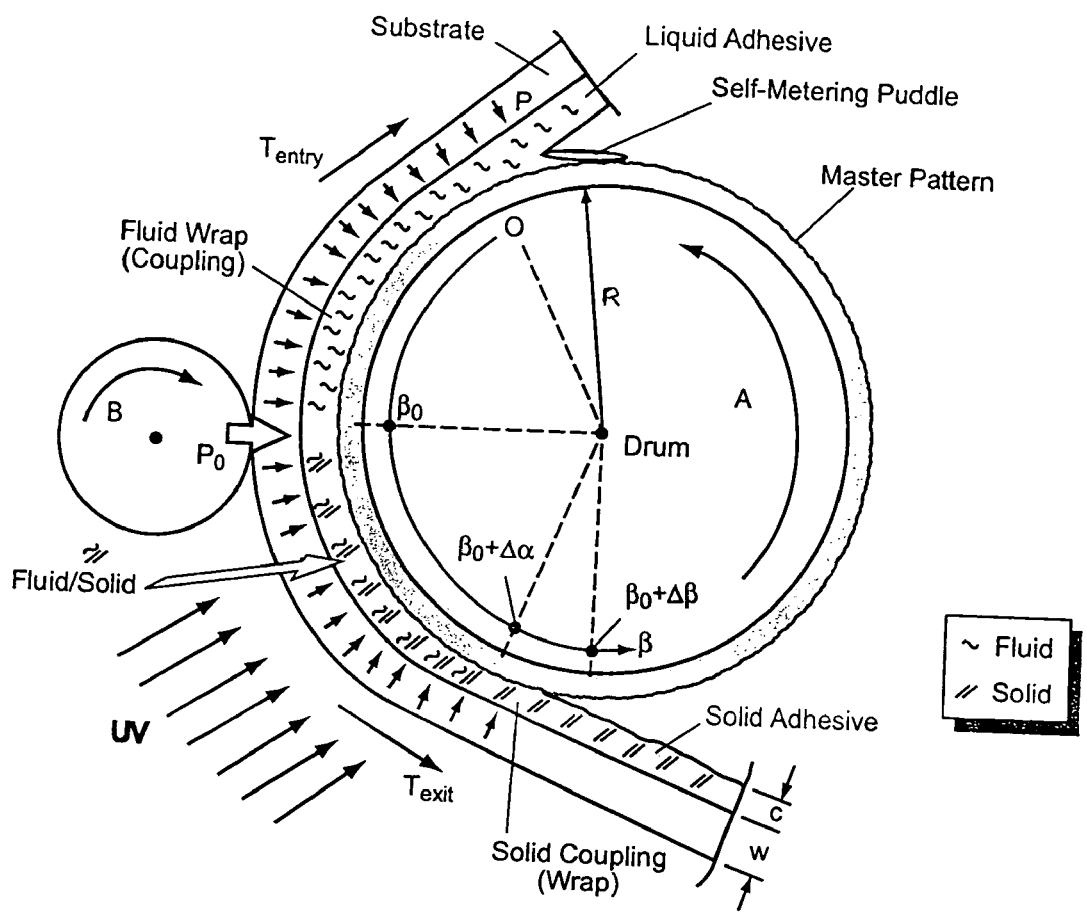
FIG. 10 is an illustration (out of scale) of the PALM process, emphasizing fluid coupling.
Figure 11:
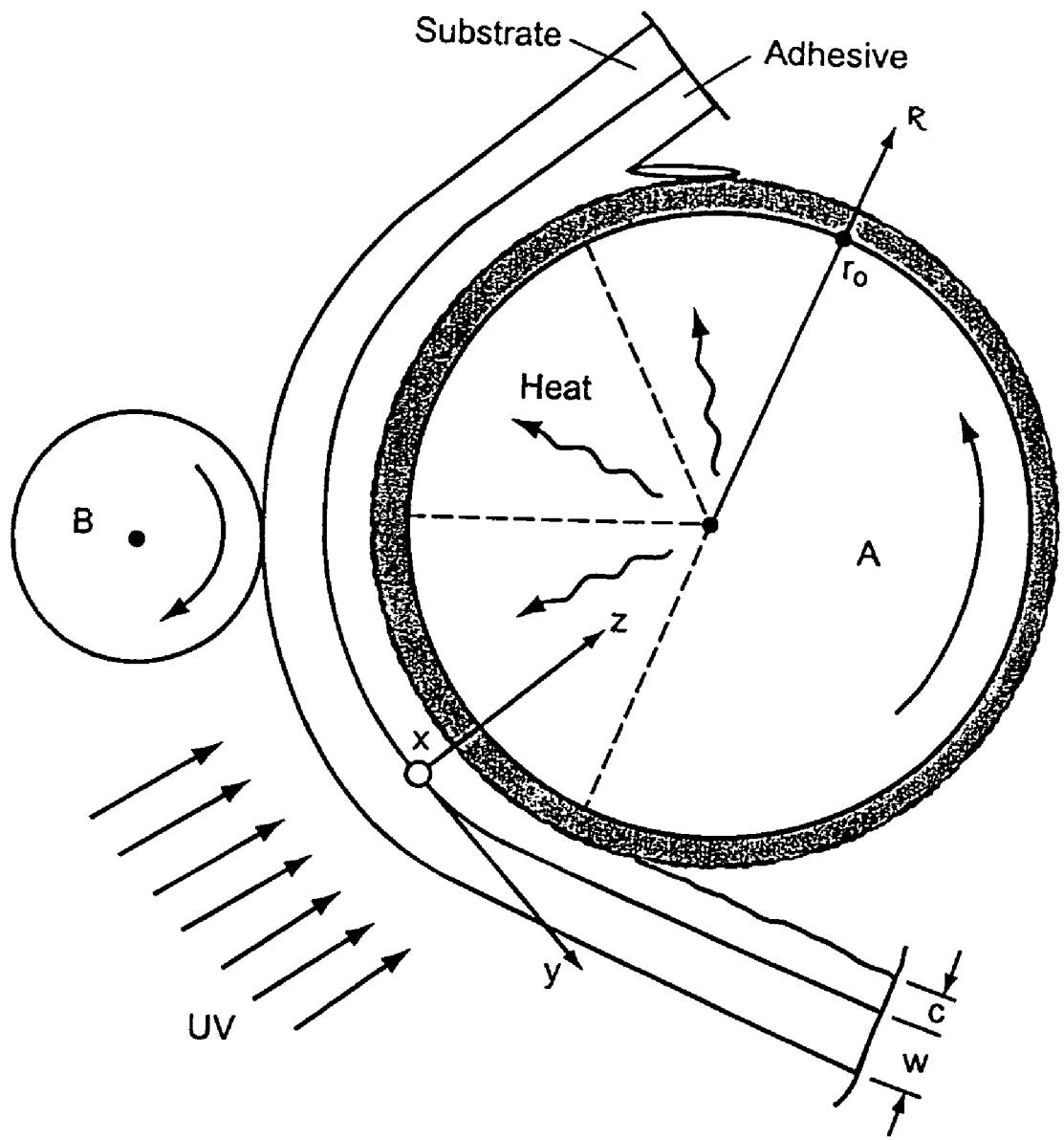
FIG. 11 is an illustration (out of scale) of a local Cartesian coordinate system (x, y, z) for the PALM process description, including heat transfer and thickness of substrate, w, and self-metering thickness, c.

In FIG. 10, the PALM process is described, including fluid and solid coupling, and the process is characterized in two coordinate systems: a cylindrical system: R, $\beta$, x, as in FIG. 10, and a local Cartesian system (x, y, z) as in FIG. 11. The cylindrical coordinate system is introduced due to cylindrical symmetry of the drum A, where R is the drum radius, and angular coordinate, $\beta$, has origin ($\beta$=0) in the wrap entry, and $\beta_0$—value at nip force, $P_0$, location, and $\beta_0+\Delta\beta$ value at the first (fluid/solid) wrap exit, while UV-radiation operates between $\beta=\beta_0$, and $\beta=\beta_0+\Delta\alpha$, at the second (solid) wrap region. In FIG. 11, the second local Cartesian coordinate system is introduced to show UV radiation exposure as well as heat transfer from the center into the surface of the drum. The substrate thickness, w, is in the range of 100 μm (4 ml), and the self-metered thickness of adhesive, c, ($c=c_1+c_2$) is in the range of 50μ—(which includes base ($c_1$) and relief ($c_2$)).

Solid/Fluid Coupling

The solid adhesive coupling is essential to the PALM because it provides a bearing force on drum A, transferred from the motoric force generated by the two rolls E and E', with strong impression forces, through solid wrap, located between $\beta_0$ and $\beta_0+\Delta\alpha$. This is also supported by fluid wrap, located between $\beta=0$ and $\beta=\beta_0$. Without such couplings, drum A would have to be driven by its own motoric force which could destabilize the kinematics of the system. Because of friction and the rotation of the drum, the actuating force T is created and which is exponentially reduced with $\beta$-increasing; thus $T_{exit}$ is smaller than $T_{entry}$ as in FIG. 10. Any element of the film, of angular length d$\theta$, will be in equilibrium under the action of the actuating forces, thus generating pressure, P, proportional to actuating force T, as shown in FIG. 10. Two coupling forces are included, pressure P, distribution and the nip force $P_0$. The solid wrap creates much stronger coupling than that of the fluid wrap.

In the PALM system, the nip shear force is much stronger than the liquid wrap force. However, for the prior art shallow pattern reliefs (equivalent to low-angle diffusers, for example), the liquid wrap is not used. In contrast, for the deep pattern reliefs, as in the PALM, the nip force is necessary. Nevertheless, it is only a "kiss" force, assuming the hybrid (i.e., non-monolithic) process.

For the liquid coupling, the sheer stress, equal to nominal pressure, p, multiplied by friction coefficient, f, is also proportional to adhesive absolute viscosity, μ, broadly described by Pettrof's law, or its modification applied to this case. The absolute viscosity coefficient, μ (hereafter, a "viscosity coefficient") is typically measured through kinematic viscosity. For the PALM purposes, the (absolute) viscosity is high. For typical adhesives, μ=3-10 dynes-s/cm²; i.e., much higher than for typical lubricants, such as castor oil. The preferred (for fluid coupling) nip force, $P_0$, is in the range of 30,000 dynes/cm². Due to large viscosity of adhesive in liquid (or semi-liquid) case, and modulus of rigidity, R, of adhesive in solid state, both forces, wrap force (both liquid and solid) and nip force, provide sufficient coupling, in order to drive drum A. It should be noted that, according to the Maxwell Theory, such highly viscous fluids, like adhesives, have "intermediate" properties, characterized by both viscosity coefficient, μ and a modulus of rigidity, R. According to Landau theory, the μ-value is proportional to R-value, through relaxation time, $\Im$. (Maxwellian relaxation time). (Landau and Lifshitz, Theory of Elasticity, 3$^{rd}$ ed, Butterworth-Heinemann (1986)).

Figure 12:
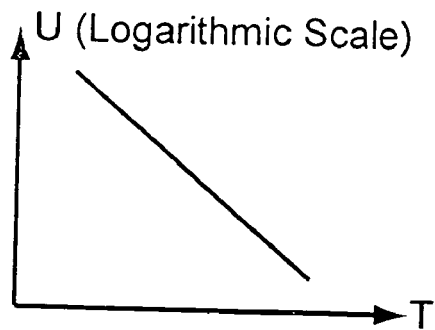
FIG. 12 is a graph of viscosity coefficient (in logarithmic scale) as a function of temperature, T, of the adhesive.
Figure 13:
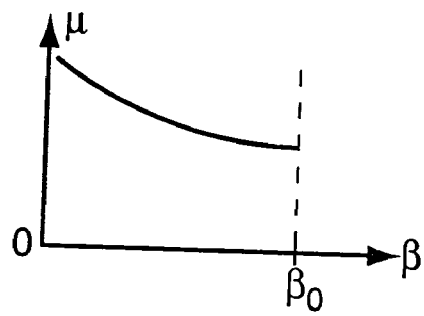
FIG. 13 shows the dependence of μ-viscosity coefficient vs. angle β, as a result of β(T) gradient where μ is in logarithmic scale.

Another important requirement for effective fluid coupling is to preserve its stability to avoid boundary lubrication; i.e., direct solid-to-solid contact. This is achieved by maintaining a sufficiently high value of the characteristic parameter: μω/p, where μ—viscosity, ω—angular velocity, and p—normal pressure, as in FIG. 10 (this parameter is dimensionless). For small values of this parameter, the elastohydrodynamic coupling can collapse to boundary coupling (i.e. direct solid-tosolid contact) that could destroy the microstructure pattern. This parameter value must be maintained in all regions from $\beta=0$, to $\beta=\beta_0$. This is controlled by regulating the entry web tension, $T_{entry}$, and the outgoing web tension $T_{exit}$, when the fluid is still in a liquid form, according to the following equation:

$$\ln\frac{T_{entry}}{T_{exit}} = f\beta_0 \quad (9)$$

where f is friction coefficient. Typical $T_{entry}/T_{exit}$ ratio should be about 2. The f-coefficient, obtained from Equation (9), should be in the range, when f-function is a linear function of $\mu\omega/p$ —parameter, according to modified Pettrof's law. This condition is difficult to maintain, because the adhesive viscosity is decreasing as a function of $\beta$, due to heat transfer from the center of the drum, as shown in FIG. 11. This heat transfer creates a temperature gradient, with adhesive temperature increasing by $\beta$—increasing, as shown in FIG. 12. Such heat transfer (creating temperature growth by 20° with respect to room temperature, by average) is needed to increase penetration of the master relief, in order to obtain a good fidelity of submicron details, important for diffusers with large diffraction angles (FWHM≧60°). For the same reasons, we can not significantly increase the angular velocity $\omega$. Therefore, we need to reduce normal pressure, p, in order to keep the parameter, $\mu\omega/p$, sufficiently high; thus, maintaining elastohydrodynamic coupling regime (to avoid boundary coupling). But, in that case, we reduce the coupling force. Therefore, in order to keep the total coupling force sufficiently high, we need to increase the nip force, $P_0$, and/or preserve high solid wrap coupling force from the regions between $\beta=\beta_0$ and $\beta=\beta_0+\Delta\beta$, as shown in FIG. 10, by increasing $\Delta\beta$-value, up to 90°, or even higher. This is a complex trade-off process which requires regulation of the heat gradient (leading to gradient $d\mu/d\beta$), as well as such parameters as $\omega$, p, and $P_0$. The UV-radiation distribution (defined by intensity, I, and $\Delta\alpha$-region, as in FIG. 10) also influences this trade-off. Such an optimization procedure is needed, especially for high-resolution (d~1 μm), and high-aspect ratio (for (AR)>1) microstructures. A typical $\mu(\beta)$-dependence is illustrated in FIG. 13.

High Relief Patterning

For high-relief patterning, i.e., three-dimensional replication of high-relief microstructures, both random (diffusers) and deterministic (microprisms), with typical reliefs in the range of 5 μm to 30 μm, up to 100 μm, we need to optimize a broad variety of mechanical, fluid, heat, and radiation (UV) parameters, such as: viscosity ($\mu$), surface energy, UV-exposure distribution, actuation force T, nip force $P_0$, temperature gradient (dT/d$\beta$), friction coefficient f, modulus of rigidity (R), drum angular (and linear) velocity ($\omega$), wrap angles ($\beta_0$, $\Delta\beta$), as well as self-metering thickness (c), partial thicknesses: $c_1$ and $c_2$ and leveling time.

A number of critical factors determine high-quality high-relief patterning of microstructure, both deterministic (such as microprisms) and random (such as diffusers), including:
1. Liquid coupling (a wrap, with angular size $\beta_0$)
2. Solid coupling (a wrap, with angular size, $\Delta\beta$)
3. Nip force from contact between roll B and roll A
4. Reservoir of adhesive (at the input of liquid wrap)
5. Heat transfer (at the liquid (fluid) wrap)
6. Distributed UV radiation (with angular size, $\Delta\alpha$).

The factors (1), (3), (4), and (5) define self-metering of the PALM. The factors (2) and (6) define solid/liquid coupling-based driving of the roll A.

Figure 14:
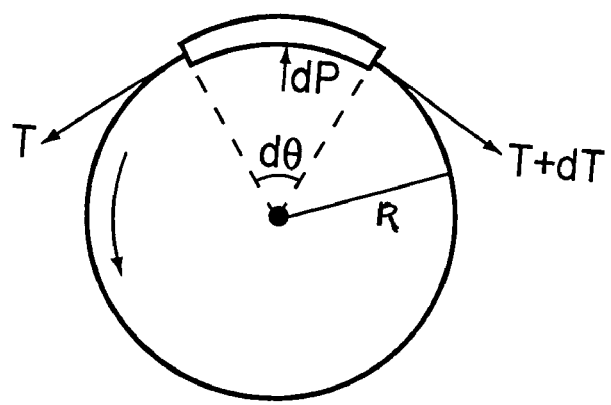
FIG. 14 is an illustration of a mechanical clutch, applied to Roll A.

Another critical factor is a combination of the UV radiation distribution, with monotonic decreasing of the coupling pressure, p, as a function of angle $\beta$. The latter feature is a consequence of simple mechanical law, coming from the mechanical clutch effect, as shown in FIG. 14. The actuation force, T, creates reaction force dP, at the decrement d$\theta$; thus, $$dT=fdP \quad (10)$$

where f—friction coefficient; also we have $$dP=Td\theta \quad (11)$$

substituting Equation (11) into Equation (10), we obtain $$dT=fTd\theta \quad (12)$$

and, after integration, we have $$T(\theta)=T_{entry}e^{-f\theta} \quad (13)$$

which is equivalent to Equation (9). The reaction force P, creates pressure, p, on the drum, as a normal force P per unit surface, in the form (l is the length of the drum A)

$$dP=plrd\theta \quad (14)$$

where $lrd\theta$, is surface element. Using Equations (11), (13), and (14), we obtain the following relation for pressure, p, as a function of angle $\theta$, $$p = \frac{T}{lr} = \frac{T_{entry}e^{-f\theta}}{lr} \quad (15)$$

which shows that pressure, p, is reduced exponentially as a function $\theta$, into direction of motion. This effect, together with UV radiation distribution creates the stable conditions of disengagement of adhesive from the master roll A.

The UV radiation is distributed along angle $\beta$, between $\beta=\beta_0$ (nip force location), and $\beta=\beta_0+\Delta\alpha$. In the three-dimensional case, ideally, it is distributed cylindrically, into the drum A axis. Assuming that UV radiation source linear intensity is 300 W/in., or 118 W/cm, and assuming that $\Delta\alpha=90°$ (or, $\pi/2$), and R=10 cm, so $r\Delta\alpha=15.7$ cm, and the source intensity, I, is $$I=118\ W/15.7\ cm^2=7.5\ W/cm^2 \quad (16)$$

PALM integrates coating, self-metering, and replication processes. For these purposes, we need to discuss the meaning of surface energy, $\gamma$, for both adhesive, substrate, and roll A master, in order to obtain a sufficiently high wettability of the substrate and master, and the adhesion of coating (adhesive). The well-known condition for good wettability and adhesion, is $$\gamma_s \geq \gamma_a \quad (17)$$

where indices "s" and "a" mean substrate and adhesive, respectively. Surface activation is used to increase the wettability of the substrate and the adhesive of the coating. The most common are the following treatments: flame, plasma, and corona, the latter one mainly used for web application. Applied to the substrate, it increases its surface energy, which, in general, has two components: dispersive, and polar (typical surface energies, in dynes/cm, are: 18-20 (for Teflon); 41-49 (for PET); 46 (for polycarbonate); and 47 (for glass):

$$\gamma=\gamma^d+\gamma^p \quad (18)$$

The dispersive component represents the non-polar Van-der-Waals (London) forces, and the polar component represents the polar Van-der-Waals forces, connected with permanent electrostatic dipole interactions and hydrogen bond forces. The corona treatment, for example, improves these interactions; thus increasing substrate surface energy, and in consequence, improving adhesion Equation (17). Equation (17) should be used for the PALM coating, wettability and adhesion of adhesive in respect to the substrate and in respect to the master during liquid coupling, and during solid coupling.

Basic Steps of the PALM Process

The following are the steps of the PALM process:
Coating (and surface activation) (Step 1)
Wetting of the Master (by Reservoir) (Step 2)
Liquid Coupling (and Temperature Treatment) (Step 3)
Nip Force Action and Self-Metering (Step 4)
UV-Radiation Exposure and Adhesion of Adhesive Pattern into substrate (Step 5)
Disengagement (or, release) of the Adhesive Patterns from the Master, and Surface Energy Interaction (Step 6).

These six (6) basic steps of PALM reinforce and cross-interact with each other. Some of them were previously discussed.

STEP 1: This step is only ancillary to the PALM process, but it should also be carefully carried out for high-quality PALM purposes. The web band (a film) consists of a flexible plastic substrate such as polycarbonate, about 100 μm thick. It should be highly uniform to avoid micro-bends. It should be pre-treated for better adhesion and wettability. The adhesive should be coated as uniformly as possible. Some adhesives' non-uniformities are cancelled by the nip force, and the reservoir also stabilizes the adhesive flow.

Figure 15:
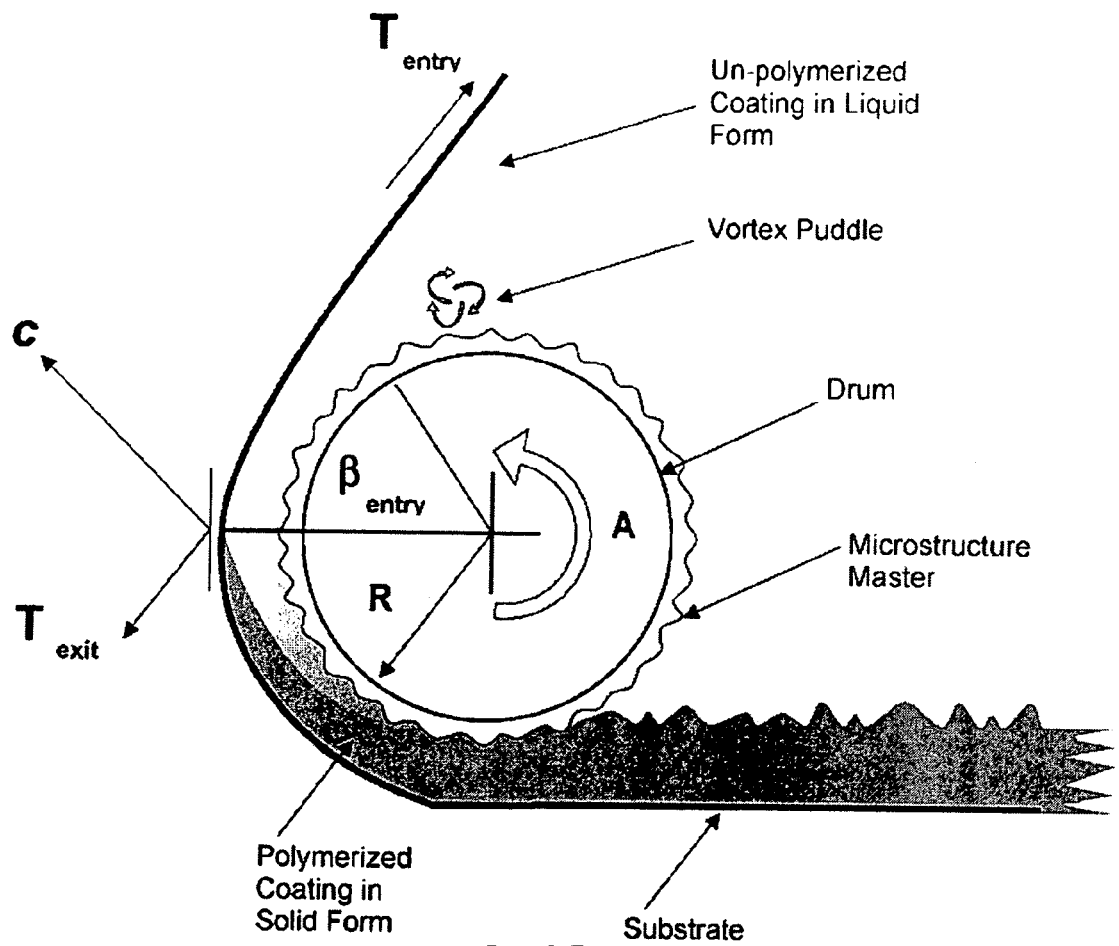
FIG. 15 is an illustration of the adhesive reservoir used in the PALM process and showing the transition of the coating from a liquid (light shade) to a solid (darker shade)

STEP 2: After STEP 1, the film (band) consists of the substrate coated with adhesive in liquid form. In the PALM process, the film comes in contact with the image drum (roll A) prior to impression roll B, in the form of adhesive excess, called a self-metering puddle, or reservoir. Creation of a reservoir for adhesive is a feature of PALM, allowing pre-wetting of the master roll A. This reservoir of adhesive should be in a vortical (not laminar) stage, in order to maximize the pre-wetting process. The reservoir, shown in FIG. 15, also stabilizes the liquid adhesive flow. In a case where the speed of the drum A is substantially lower than 10 rpm, the volume of reservoir will be excessively large, while in a case of too-high speed of drum A, substantially higher than 10 rpm, the volume of the reservoir can almost vanish, creating unwanted boundary coupling between rolls A and B. In general, the presence of the reservoir allows for small non-uniformities of adhesive flow; thus, regulating its constant volume rate through contact between the web band (film) and master roll A.

Figure 16:
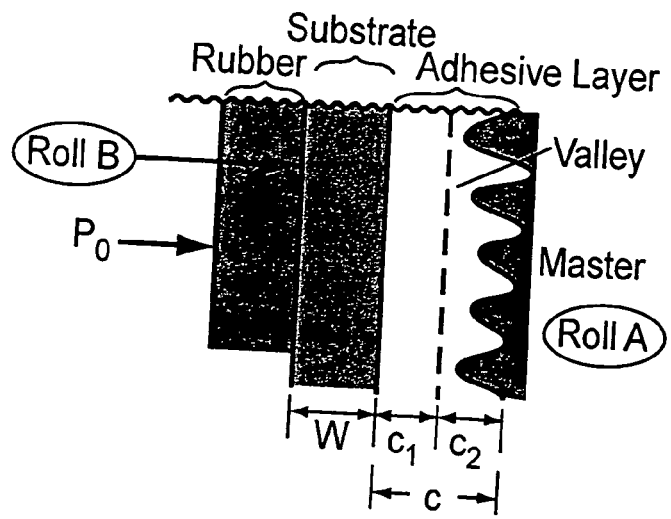
FIG. 16 is an illustration of the substrate and adhesive layers at the contact between roll B (with nip force $P_0$) and roll A.

STEP 3: The liquid coupling is essential for the PALM, especially for high-relief replications. It allows substantially filling even high-relief master pattern valleys with an adhesive layer of thickness, c, (about 30 μm) which consists of its base sub-layer, $c_1$, and adhesive relief sub-layer, $c_2$, as shown in FIG. 16, for the roll B/A-contact. The liquid coupling also supports the bearing of roll A. The presence of the liquid wrap is essential for high-quality replication of high-relief micro-patterns. Its presence allows also for heat transfer from the interior of the roll A, in order to reduce adhesive viscosity for better filling of master surface relief. The presence of the substantial base sub-layer (so-called residual thickness), with thickness, $c_1$, is also essential in order to obtain a strong "stalactite" type structure (by analogy to caves' stalactites). The high strength of "stalactite" (especially at "valleys," as in FIG. 16) is important for the purpose of the overall strength of adhesive relief structure, especially during the structure's disengagement in STEP 6.

STEP 4: All three steps (2), (3), and (4), allow for the self-metering of the PALM. The self-metering simplifies the PALM process to a large extent, as expensive pre-metering equipment such as slot coating applicators are not needed to apply the coating (adhesive) fluid. Thus, simpler coating applications can be used to apply the radiation curable coating fluid on the substrate. When a nip roll is used in the metering zone, the radial pressure and the tensions change self-consistently, making the metering substantially independent of the incoming fluid volume, due to STEP 6, as well as due to STEPS 2 and 3.

In summary, at the wrap of the drum A and the web, the coating is self-metered by the tension of the web band around the drum, as well by the nip force. The nip pressure should be in the range of 1-30 lb./in.². In addition, the nip force also stabilizes thickness, $c_1$, of the base layer making it uniform, in spite of some non-uniformities of the coating process. For the purposes of the summary of the PALM process, there are several important events at the interface of the drum (roll A) and the web (film-band, and roll B). They are:

Conforming of the liquid coating (adhesive) into the master pattern (STEPS 2, 3 and 4)
Change of viscosity of the coating from a high value to a lower value due to thermal gradients (STEP 3)
Thermal equilibrium of the coating (STEP 3)
Radiation curing followed by phase change of the coating from a liquid to a solid (STEP 5)
Release of the cured coating from the master pattern (STEP 6).

This process must proceed continuously for the entire length of the web stock.

STEP 5: The UV-radiation, in the range of 10 W/cm², should be uniformly distributed at the cylindrical area with angular dimensions, $\Delta\alpha$, in the range of 90°, or $\pi/2$, and linear dimensions: $r\Delta\alpha$, and l, where r is about 10 cm, and l is about 1 m. This area is equal to, or slightly exceeds the solid coupling (wrap) area, with angular dimensions $\Delta\beta$. The time of exposure, $t_E$, can be computed from Equation (7), where length s, is replaced by $R\Delta\alpha$; i.e., for R=10 cm, $\Delta\alpha=\pi/2$, and V=10 cm/s, we obtain $$t_E = \frac{R\Delta\alpha}{V} = \left(\frac{\pi}{2}\right)\frac{10\,\text{cm}}{10\,\text{cm}/s} = 1.6s \tag{19}$$

and, for I=7.5 W/cm², the exposure of UV-radiation is 12 J/cm². During the UV-exposure process, the adhesive layer is cured (hardened) into solid form. In FIG. 11, the geometry of this process is presented, with local Cartesian coordinate system, directed (z-axis) into the center of the roll A. The origin of this coordinate system (z=0) is at the interface between substrate and adhesive surfaces. During the exposure process two critical effects occur: (1) increasing of surface energy, $\gamma_a$, of the adhesive layer (and, of the substrate layer); (2) increasing of transmissivity of adhesive layer due to phase change. This process starts at z=0 and progresses in the z-direction. Therefore, the adhesivity of the substrate-adhesive interface must be a priori high. The direction of UV-radiation can be also in the opposite (to z-axis) direction. However, the positive direction (into z>0) of UV radiation is preferable, since, in such a case, the adhesive base layer, ($c_1$) is cured first, to create the stable base for the adhesive micro-pattern.

STEP 6: At the end of the PALM process, the self-metered phase changing coating needs to attach to the substrate and not to the master pattern. This is accomplished by interaction (matching) surface energies of the various interfaces. Two effects stabilize this disengagement process of relieving solid adhesive from the master pattern: (1) increasing surface energy of adhesive due to UV-exposure, and (2) reducing of normal pressure of the web, p, with $\beta$-angle increasing, as in Equation 15). Also, cooling of the solid wrap, by cold nitrogen flow, for example would be preferred, especially for high surface reliefs.

Monolithic PALM Process

Figure 17:
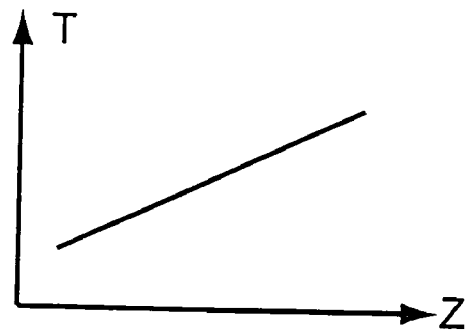
FIG. 17 is a longitudinal temperature gradient into z-direction, in the PALM-modified monolithic process.

In an embodiment of the PALM process for replication of a monolithic pattern, the adhesive layer is replaced by a partially melted dielectric substrate layer, due to applying temperature distribution, as in FIG. 11, to almost the melting point of the substrate. Due to a temperature gradient in the z-direction, as in FIG. 17, the higher-z sub-layers of the substrate will have higher temperature than lower-z sub-layers. Thus, the higher-z sub-layers will be more melted then lower-z ones. In addition, we need to apply extra pressure, both from tension (actuation) forces, T, and from impression force, $P_0$. The latter force will no longer be a nip (or "kiss") force, but instead will be a strong pressure force. In addition, it is necessary to apply intensive cooling of the solid wrap, preferably by cold nitrogen gas flow. In such a case, the substrate monolithic pattern can be effectively removed from the master pattern; thus creating a substrate monolithic surface relief pattern.

In the alternative version of the monolithic PALM process we still apply adhesive, as in Region III of FIG. 7, but the role of the substrate is only auxiliary, being only transporter for the adhesive layer. Then, Regions IV, V, VI, an VII are repeated as in FIG. 7, except substrate surface energy must be sufficiently high to transport the adhesive with relief pattern as in FIG. 16, but not too high to enable later disengagement from the adhesive layer; see Equations (17) and (18). These equations have to be carefully applied to optimize this disengagement process, as well as applying cold nitrogen flow to improve curing process in Region VII. Then, just after disengagement, in Region VIII, the adhesive, still in semi-solid form, should be coated on an auxiliary low-cost protective substrate, applied for mechanical stability purposes. This stability is needed to provide secure transportation of the resulting product. As a result, we obtain the monolithic diffuser film, with removable protection layer. This is in contrast to the hybrid diffuser film; i.e., diffuser coated on a substrate, as in FIG. 11.

Figure 18:
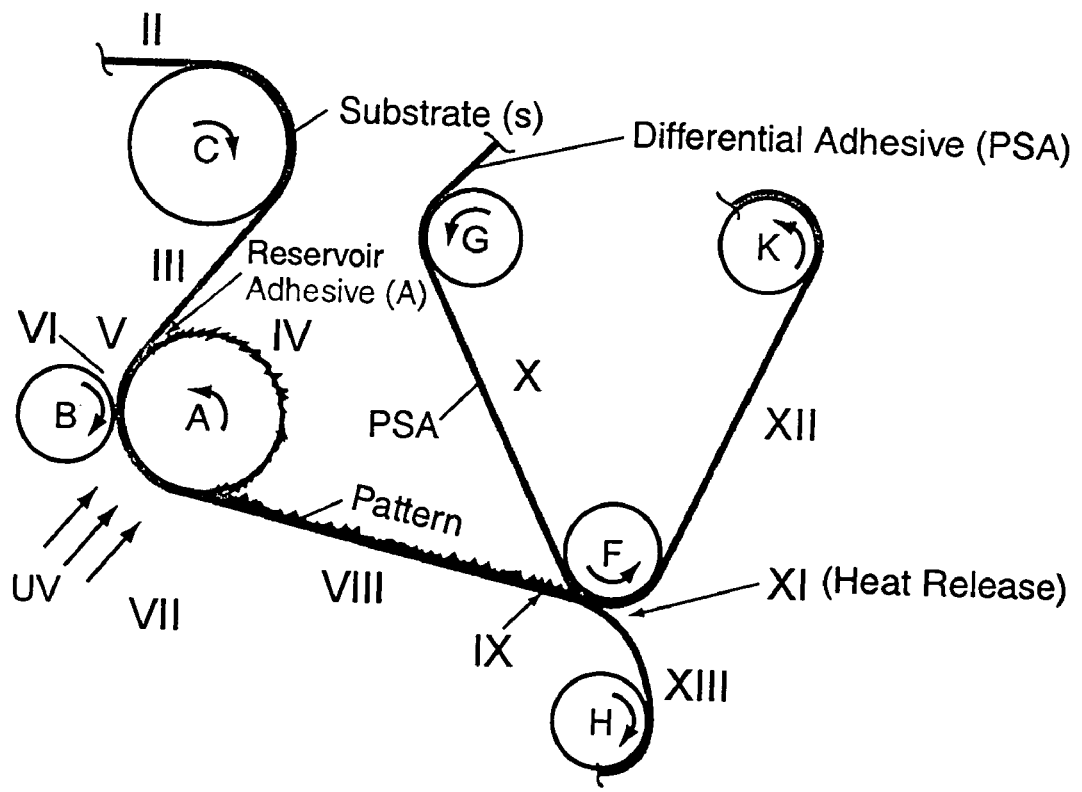
FIG. 18 is a representation of a first embodiment of the monolithic PALM process.

For purposes of this invention, we propose two versions of the monolithic PALM process; A and B. Version A, discussed above, has been illustrated in FIG. 18. We see that the Regions I through VIII, are the same as in FIG. 7, but the Regions IX, X, XI, XII, and XIII are new ones (Region IX is different from that in FIG. 7). Also, rolls F, G, H, K are new ones.

In order to disengage the substrate (S) from the adhesive (A) film with three-dimensional-micropattern, obtained from the patterning roll A, heat treatment is provided in Region XI; thus, substrate (S) is rolled into roll H in Region XIII. In parallel, differential adhesive (PSA) is transported from roll G in Region X into roll F. Since this adhesive is very sticky, it will attract epoxy (adhesive A), to serve as its strength-protective substrate, to transport it into Region XII and roll K. As a result, the micropatterning film, obtained in this A-version of the monolithic PALM process (MPP), will be rolled out on the roll K, without substrate (S).

Figure 19:
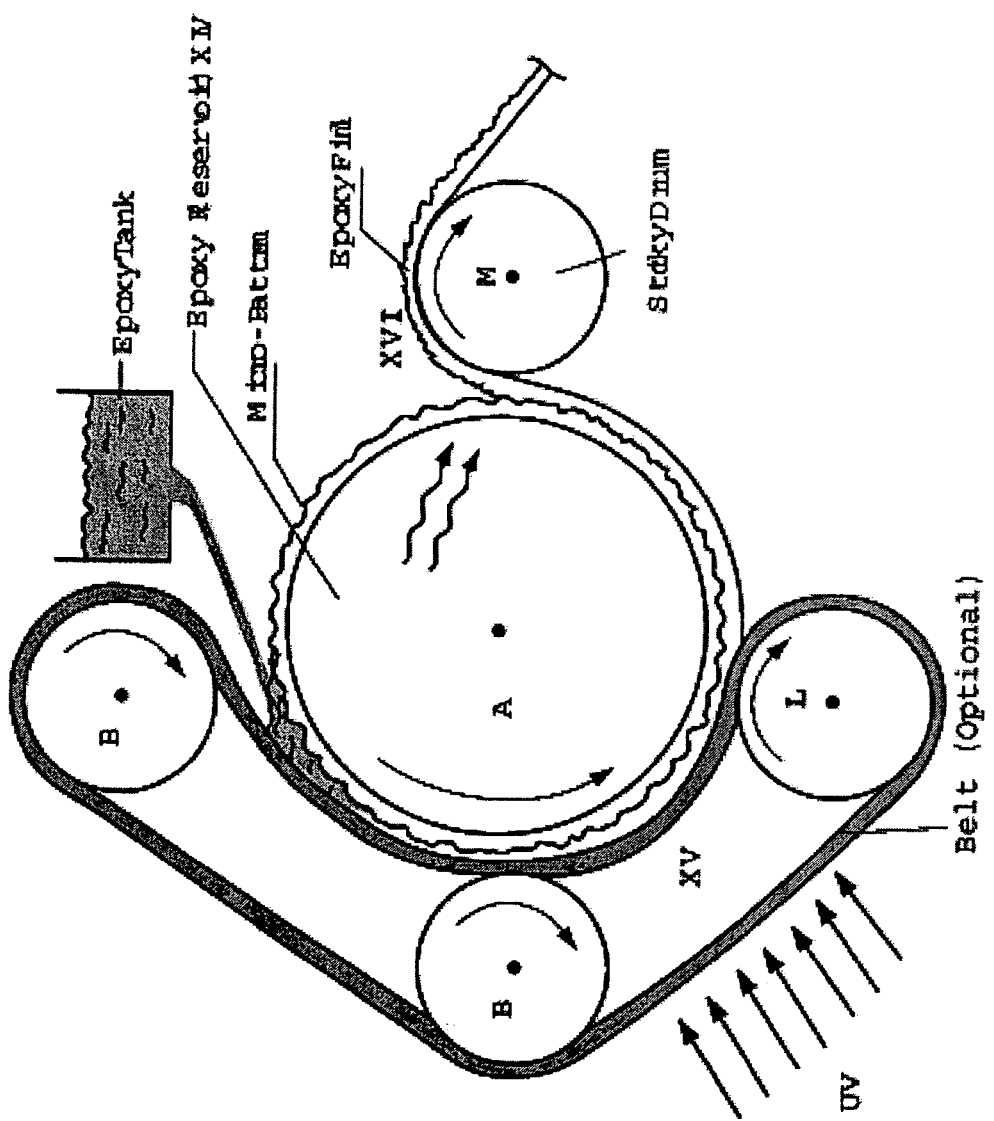
FIG. 19 is a representation of a second embodiment of the monolithic PALM process.

In version B of the monolithic PALM process, the process is further removed from the hybrid version. Instead of Regions I and II, the epoxy tank is introduced for coating purposes, as shown in FIG. 19. Due to use of a looped belt in Region XIV, the epoxy reservoir is created, creating a self-metering process as in FIG. 7. Then, it is guided into a space between patterning roll A, and the belt between rolls C, B and L. After curing in Region XV, by UV radiation, it is removed from the roll A due to vacuum drum M, and heat treatment, as shown in FIG. 19. As a result, the micropatterning film, obtained in this B-version of the PALM process will be rolled out, without substrate; or, in alternative version, will be coated on the differential adhesive (PSM), as a strength-protective substrate for easier transportation (into customer).

There are two particularly unique aspects of VERSION B: (1) Epoxy is used which is not self-consistent material, i.e., it is created from liquid form. In contrast, prior art systems apply only self-consistent materials such as resins. (2) An extra belt (rolls C, B and L) is applied to form the epoxy film and to provide the self-metering vortical reservoir feature of the invention.

Advanced Design of the PALM for Large-Scale Webs

Figure 20:
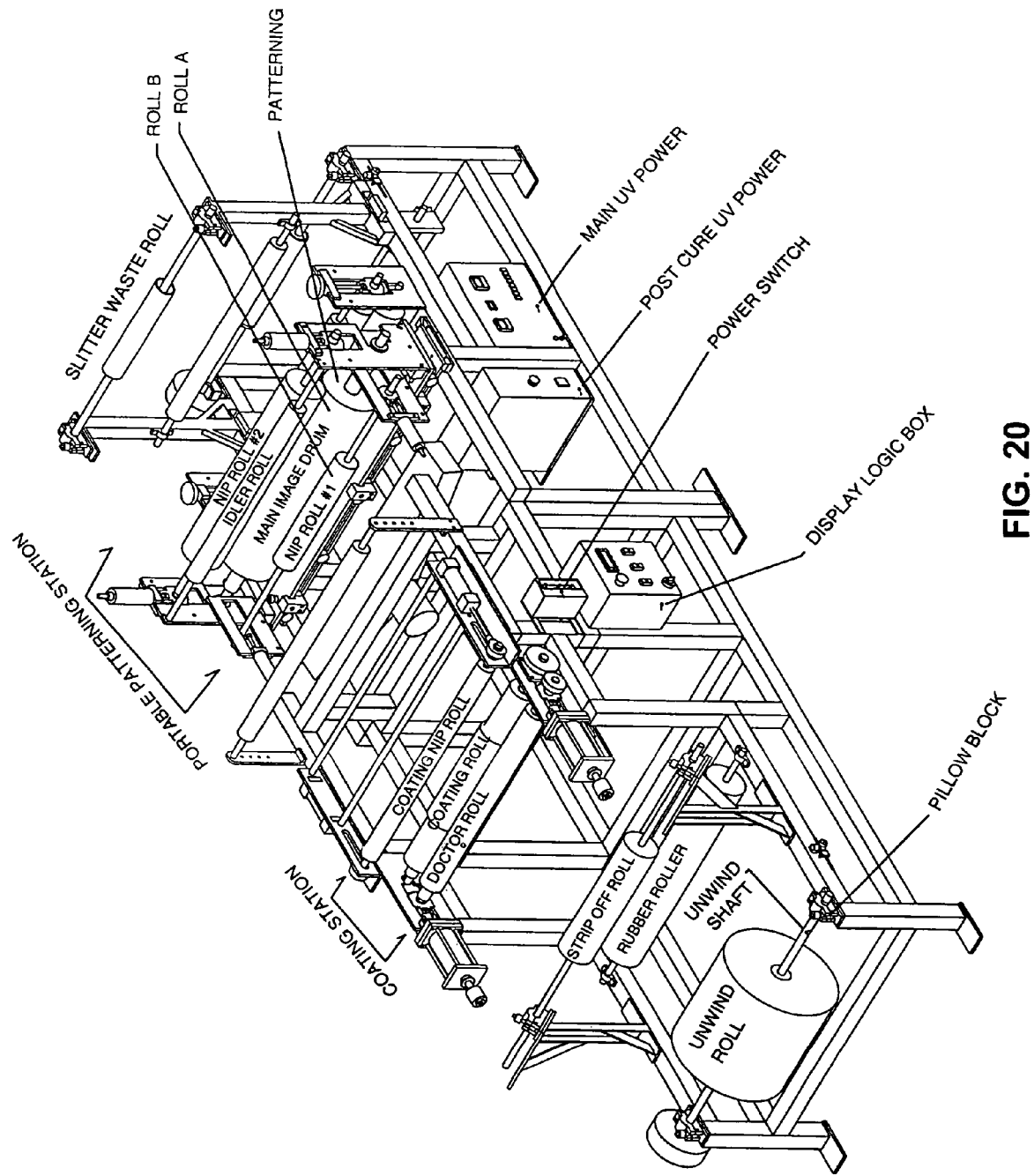
FIG. 20 is a three-dimensional illustration of the PALM hybrid system, including an innovative patterning part, and standard coating parts.
Figure 21:
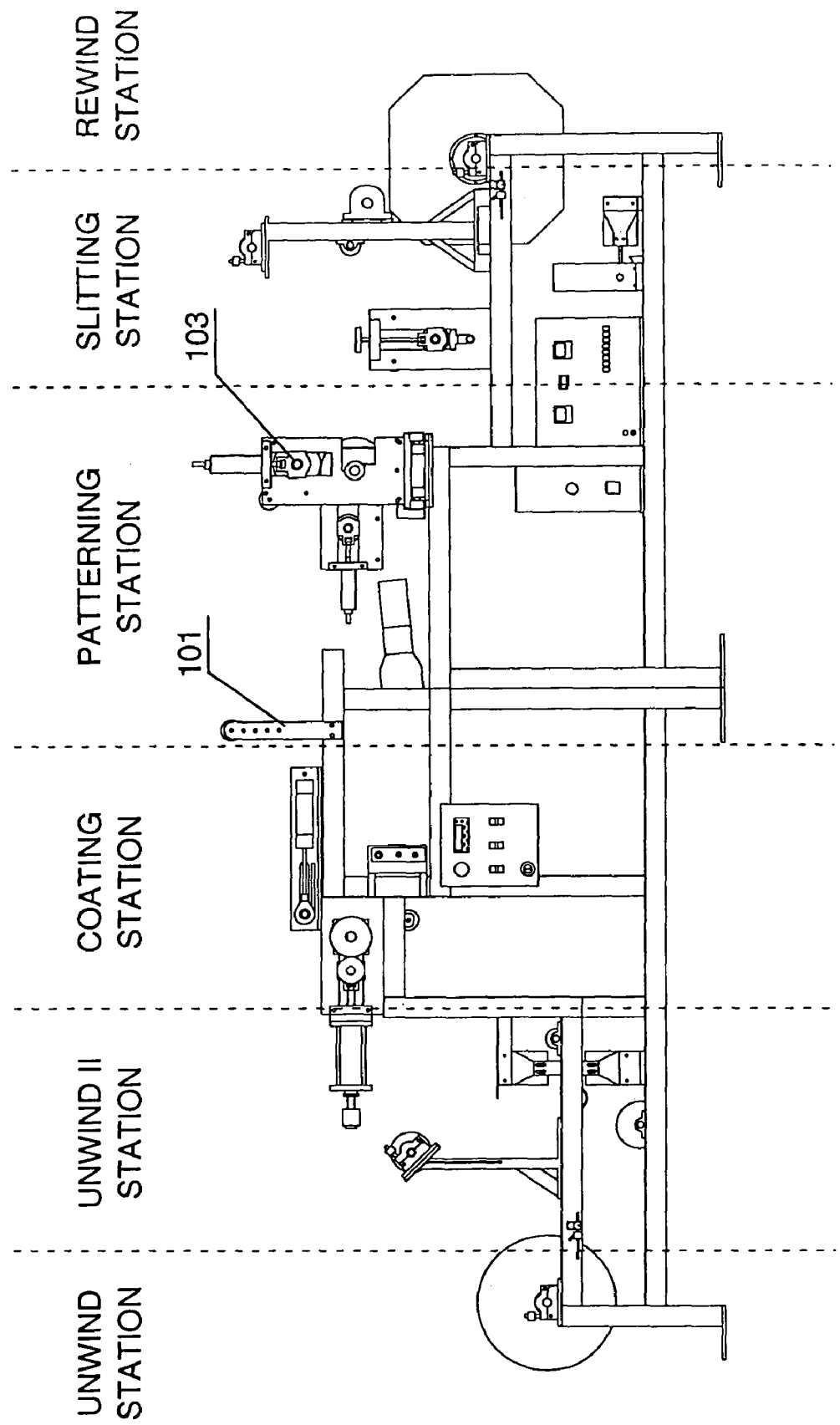
FIG. 21 is two-dimensional illustration of the PALM system.

In the case of large-scale PALM webs, with roll widths of 2 m, or even higher, the hybrid structure of the PALM device cannot be used. By "hybrid" structure, we mean that the patterning (casting) PALM device, constitutes only the "patterning station" part of the overall device as in FIG. 20 (three-dimensional version), or FIG. 21 (two-dimensional version), while remaining parts are adapted from standard imprinting web. In contrast, in the case of a new generation of a large-scale PALM web, all web stations, not only patterning ones, need to be designed and developed.

In order to mitigate the non-uniformities of the tension forces, the invention uses elastomer rollers rather than rigid rollers. Since film generally is thin (about 4 mills), the inertia will create extra-tension, especially in the case of large-scale webs. Therefore, to avoid over-stretching (plastic deformation), a synchronized drive is recommended, rather than single motoric force drive, as in FIG. 7. This will add to the complexity of the system but, it will mitigate tension force non-uniformities that would damage the film. Also, distances between rollers should be as small as possible to avoid plastic deformation. For the same reason, lighter carbon composite rollers (same strength, but lighter) should be used to minimize the amount of inertia, in order to minimize driving force to rotate the rolls. All of these improvements, applicable for large-scale webs, are deemed to be a protected embodiment hereof.

Synchronizing the drive to avoid over-stretching and plastic deformation may be accomplished by controlling the motor speed at each driven roller or drum. In the present invention such speed control is preferably implemented by providing sensors at each driven roller to locally sense film tension. The signals generated by such sensors are input to a central processing unit which then sends out motor speed control signals to each driven roller. Thus, the sensors, central processing unit and drive motors from a feedback-based sensor network that effectively synchronizes roller speeds to preclude any excessive local tension that could otherwise damage the film by permanent deformation or even breakage.

Figure 22:
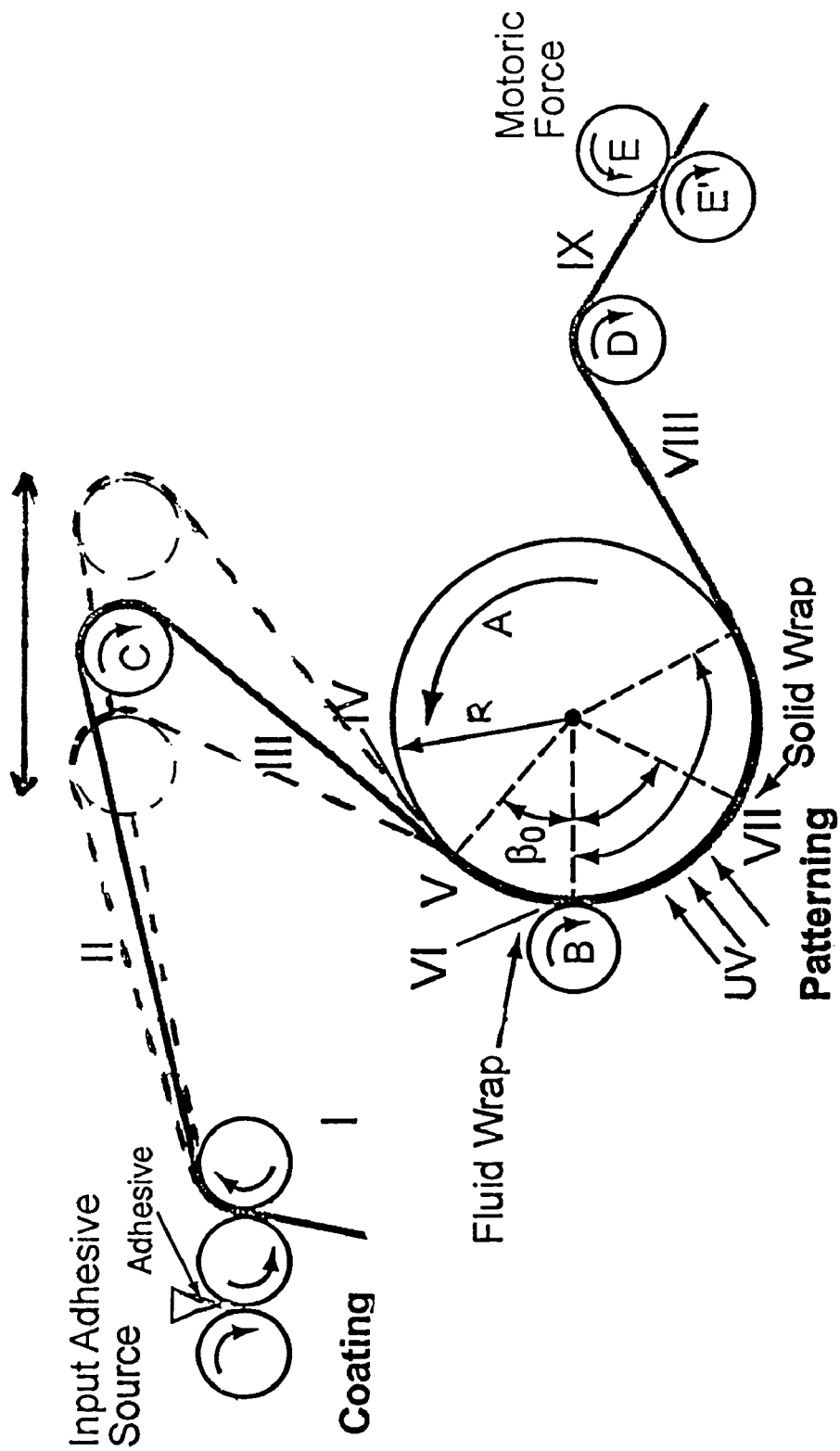
FIG. 22 is an advanced version of a PALM system.

One significant feature of an advanced PALM system is shown in FIG. 22 as an adjustable position idler roll C which would provide an optimum liquid wrap angle $\beta_0$. This parameter would be selected to provide the best replication results for the particular microstructure pattern involved, which brings us to the following discussion:

Optimization Procedure for Wrap Angles as a Function of Relief Pattern Size

Figure 1:
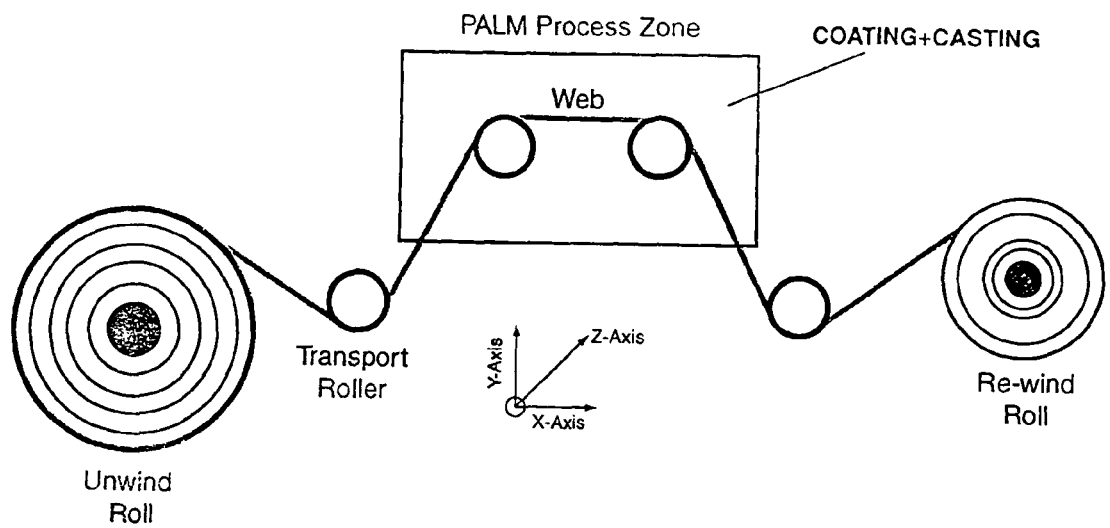
FIG. 1 is a simplified representation of an architecture of the PALM system.
Figure 2:
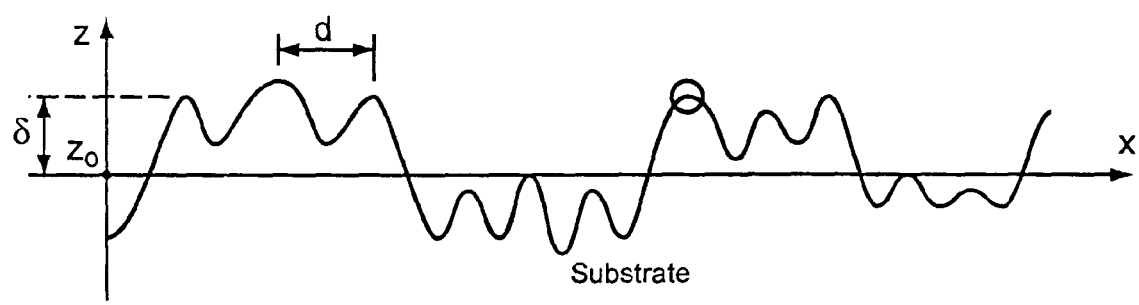
FIG. 2 is an illustration of a two-dimensional projection of a random pattern.
Figure 3:
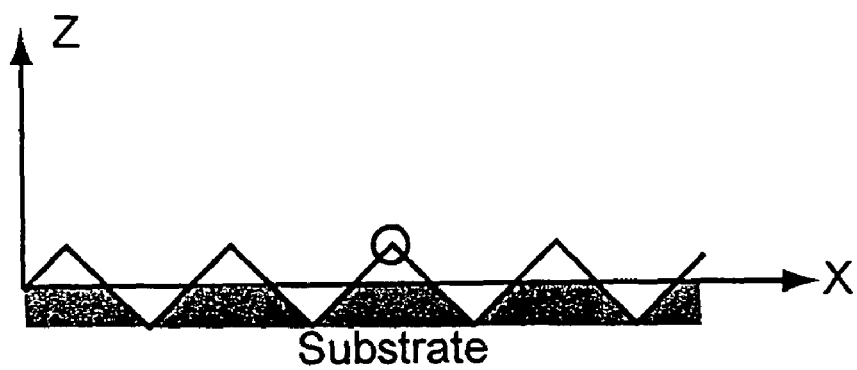
FIG. 3 is an illustration of a two-dimensional projection of a deterministic (repeatable) pattern.
Figure 4:
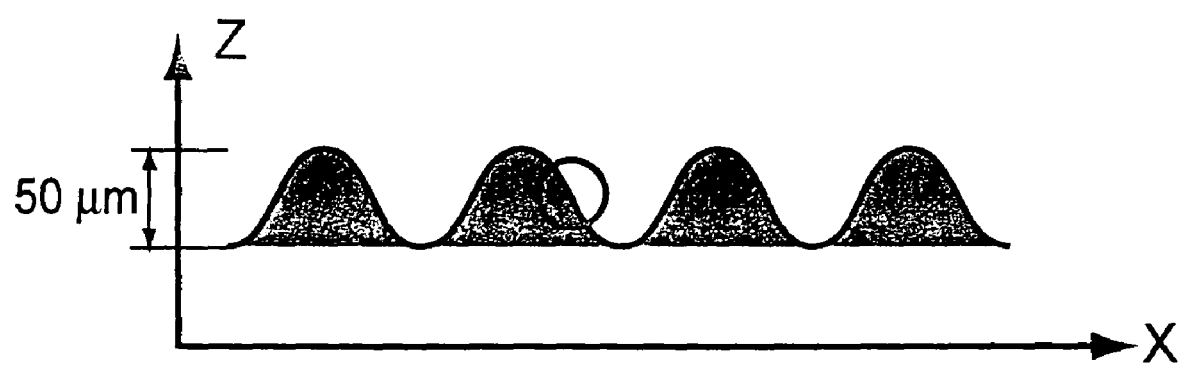
FIG. 4 is a two-dimensional projection of an advanced BEF microstructure with rounded edges (finite radii of curvature), replicable by PALM.

The existence of self-metering and adhesive reservoir is especially critical for random structures such as diffusers, since it allows for self-stabilization of liquid adhesive flow, independently on δ-local value (see FIG. 2). It is also useful for deterministic (periodic) structures as in FIGS. 3 and 4. When δ-r.m.s is growing, thus, $β_0$-optimum value is also growing, as shown in Table 1, where the optimum $β_0$-values have been given, for specific patterning roll (A) radius, R≅10 cm.

TABLE 1

| δ | <1 μm | 1–2 μm | 2–5 μm | 5–10 μm | 10–20 μm | 20–50 μm | 50–100 μm |
|---|---|---|---|---|---|---|---|
| $(β_0)$min. | 0° | 5° | 10° | 20° | 30° | 30° | 30° |
| $(β_0)$max | 70° | 70° | 70° | 70° | 70° | 70° | 70° |
| $(β_0)$opt | 0° | ~5° | ~30° | ~45° | ~55° | ~60° | ~65° |

We see that the high-quality web operation is possible only within the range $$(β_0)_{min} \leq (β_0) \leq (β_0)_{max} \quad (20)$$

where $(β_0)_{max}$ and $(β_0)_{min}$ are upper and lower bounds. The optimum $(β_0)$-value is within the range determined by Equation (20). We see that while lower the bound increases δ-value, the upper bound can not exceed 70°. Then, reservoir volume, $Ω_r$, is too small to preserve self-motoring.

Figure 5:
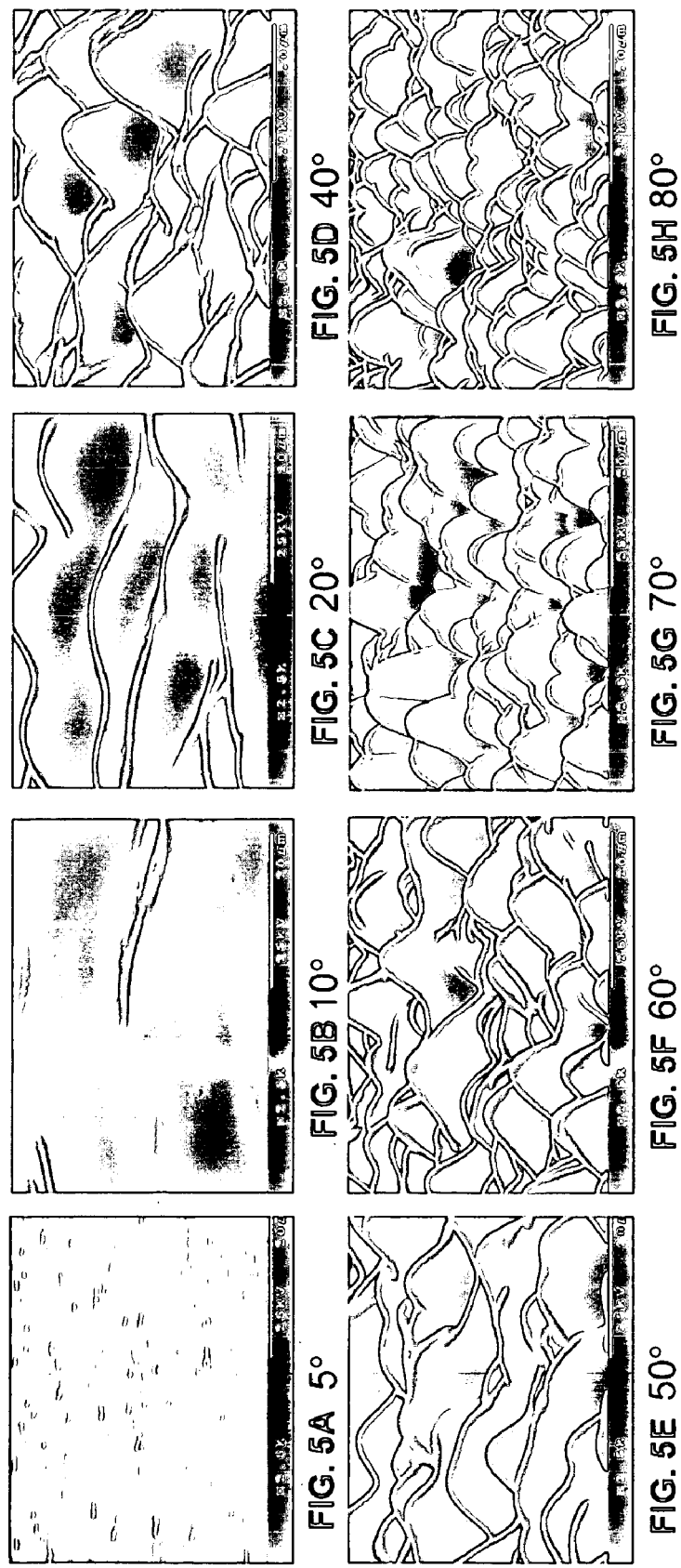
FIGS. 5A through 5H are views of SEM microphotographs (scale: 20 μm) of circular diffusers, with FWHM angles of: (A) 5°; (B) 10°; (C) 20°; (D) 40°; (E) 50°; (F) 60°; (G) 70°; (H) 80°.
Figure 6:
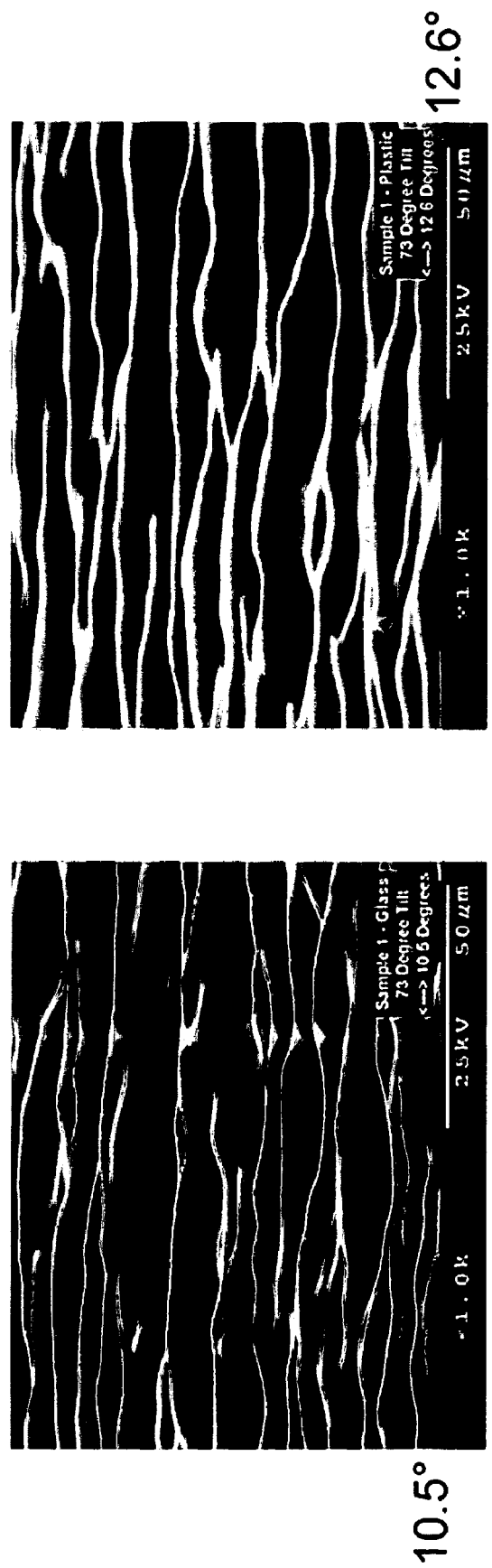
FIGS. 6A and 6B are views of SEM microphotographs of elliptical diffusers.

In Table 1, the experimental values are presented, obtained from changing of $(β_0)$-value (see FIG. 7). This is also illustrated in FIG. 8. For example, for δ=2-5 μm (critical r.m.s. value for large-angle diffusers (see FIG. 5)), where δ≅5 μm, for FIG. 5(g), we have $(β_0)_{opt}$~30°, for R=10 cm (the radius of patterning A-roll, as in FIG. 5). There are a lot of combination of R-values, and $β_0$-values; thus, the experimental procedure (trying many prototypes with various (R, $β_0$)-combinations) can be very expensive and time-consuming.

Therefore, the theoretical optimization procedure should be given, in order to identify the Region of Interest (ROI) of $t_w$, and $Ω_r$ values, where $Ω_r$ is reservoir volume ($Ω_r$=l·$A_r$; $A_r$—reservoir area), and $t_w$ is wrap time, in the form:

$$t_w = \frac{(β_0) \cdot R}{V} \quad (21)$$

where V is linear roll speed, as V=10 cm/s in Equation (6). The optimization procedure should start from developing proper roll speed value. This is because the geometry of the UV-source is determined; defined by Δα·R in FIG. 7, as well as adhesive's required UV-exposure, E, and the intensity of UV-source; I, thus, the required exposure time can be found from the relation:

$$t_E = \frac{E}{I}. \quad (22)$$

Figure 23:
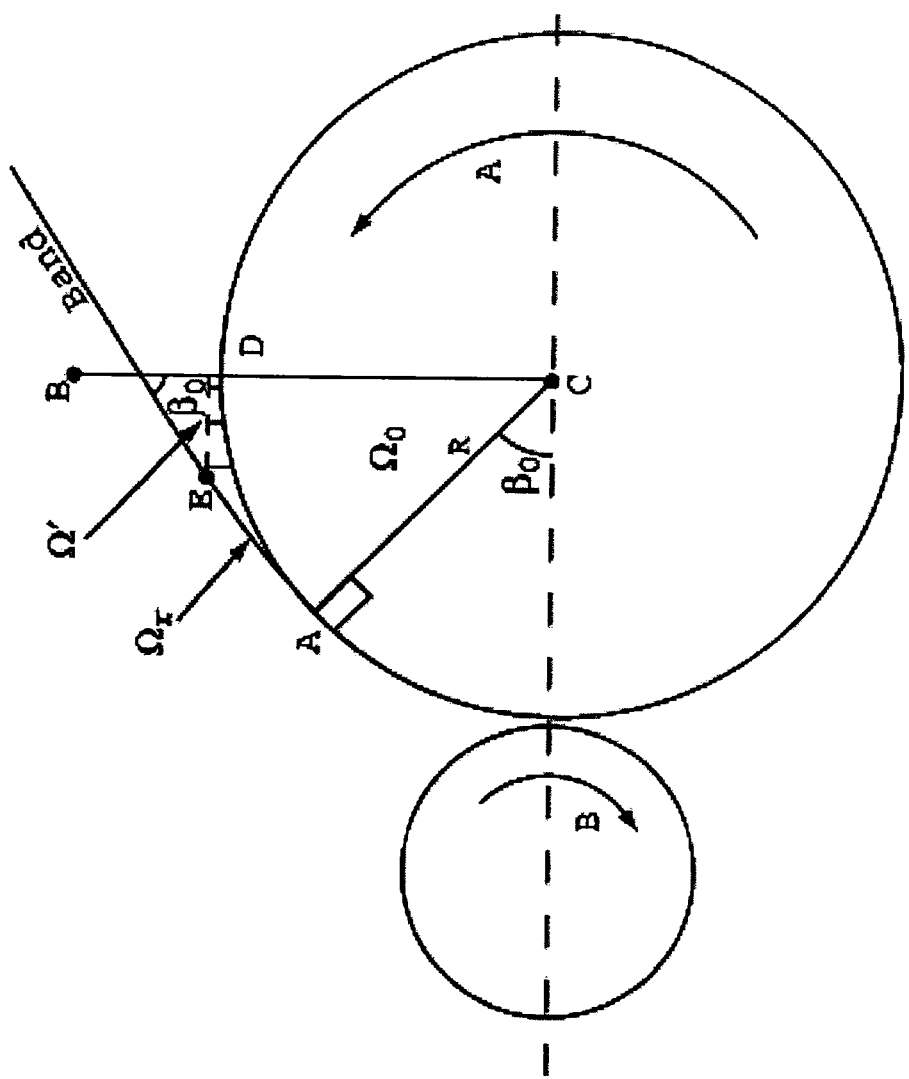
FIGS. 23 through 27 are used to explain a procedure for optimizing wrap angle for different relief pattern sizes.

For example, for our adhesive, the required UV-radiation exposure is 12 J/cm² (this is quite a high value, but the adhesive layer is quite thick), and UV-source intensity is 7.5 W/.cm²; thus, $t_E$=1.6 s (see Equation (16)). However, s=Δα·R is also known, because source spread area is known (e.g., s≅16 cm); thus, from $$t_E = \frac{s}{V} \quad (23)$$

we can find roll speed: V=s/$t_E$=16 cm/1.6 s=10 cm/s, as in Equation (16). Therefore, the roll speed is determined by adhesive material's sensitivity (E), UV-source intensity (I), and source spread linear area (s). Having V-value, we can use Equation (21). In general, the wrap time, $t_w$, has to grow with δ-value increasing, because for larger sizes of relief pattern, more time is required to fill patterning grooves (see FIG. 15), leading to increasing $β_0$-value, as in Table 1. For specific speed (V) and specific R-value, wrap time $t_w$ is proportional to $β_0$-value, as in Equation (22). However, also reservoir volume $Ω_r$, should increase. It is illustrated in FIG. 23, as:

$$Ω_r = Ω_T - Ω_0 - Ω' \quad (24)$$

where $Ω_T$ is the volume of the space including total cross-section (triangle ABC), and roll length l, in the form $$Ω_T = \frac{R^2 l}{2 \tan β_0}; \quad (25)$$

$$A_T = \frac{R^2}{2 \tan β_0}$$

where $A_T$-cross-section area ($Ω_T$=l$A_T$); thus, instead of Equation (24), we can write $$A_r = A_T - A_0 - A' \quad (26)$$

where $$A_0 = \left(\frac{π}{2} - β_0\right)\frac{R^2}{2}, \quad A' = \frac{1}{2}R^2\left(\frac{1}{\sin β_0} - 1\right)^2 \tan β_0 \quad (27)$$

thus, $$A_r = \frac{R^2}{2}\left[\frac{1}{\tan β_0} - \frac{π}{2} + β_0 - \left(\frac{1}{\sin β_0} - 1\right)^2 \tan β_0\right] \quad (28)$$

or, the normalized reservoir area, is $$Ar_n = \frac{2A_r}{R^2} = f(β_o) = \frac{1}{\tan β_0} - \frac{π}{2} + β_0 - \left(\frac{1}{\sin β_0} - 1\right)^2 \tan β_0 \quad (29)$$

In order to check the correctness of Equation (29), we obtain $$\frac{A_r}{β_o} = 0 = R^2\left(\frac{1-π}{4}\right), \text{ and } \frac{A_r}{β_o} = \frac{π}{2} = 0. \quad (30)$$

Figure 24:
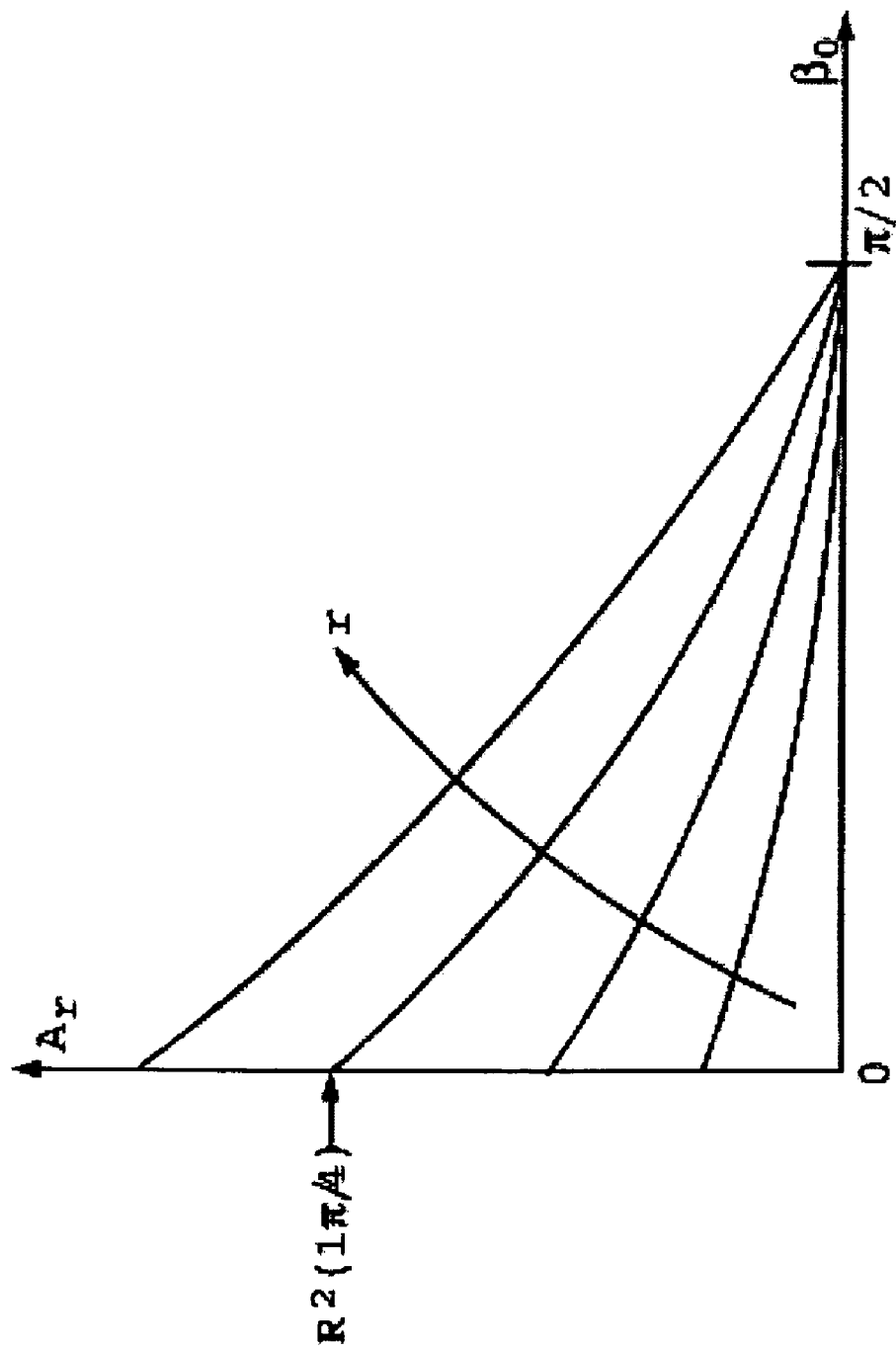
Figure 25:
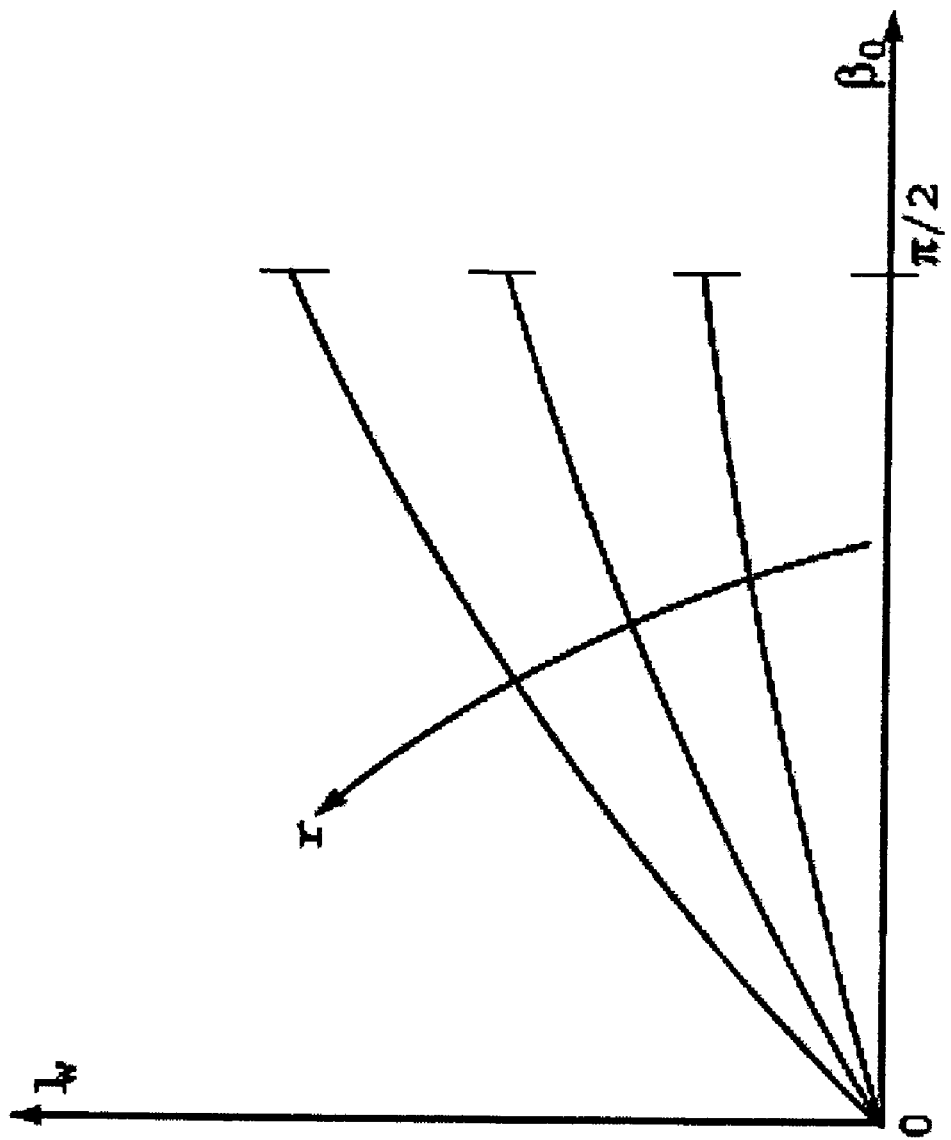

The second limit explains why the upper bound of $\beta_0$-value can not achieve 90%, as in Table 1. For small $\beta_0$-values, we have:

$$A_m \cong 2 - \frac{\pi}{2} - \frac{3}{2}\beta_0 \tag{31}$$

so, indeed, in the limit of $\beta_0=0$, we obtain Equation (30); similarly for $\beta_0=\pi/2$. The general relations Equations (29) and (31) have been shown in FIGS. 24 and 25.

Figure 26:
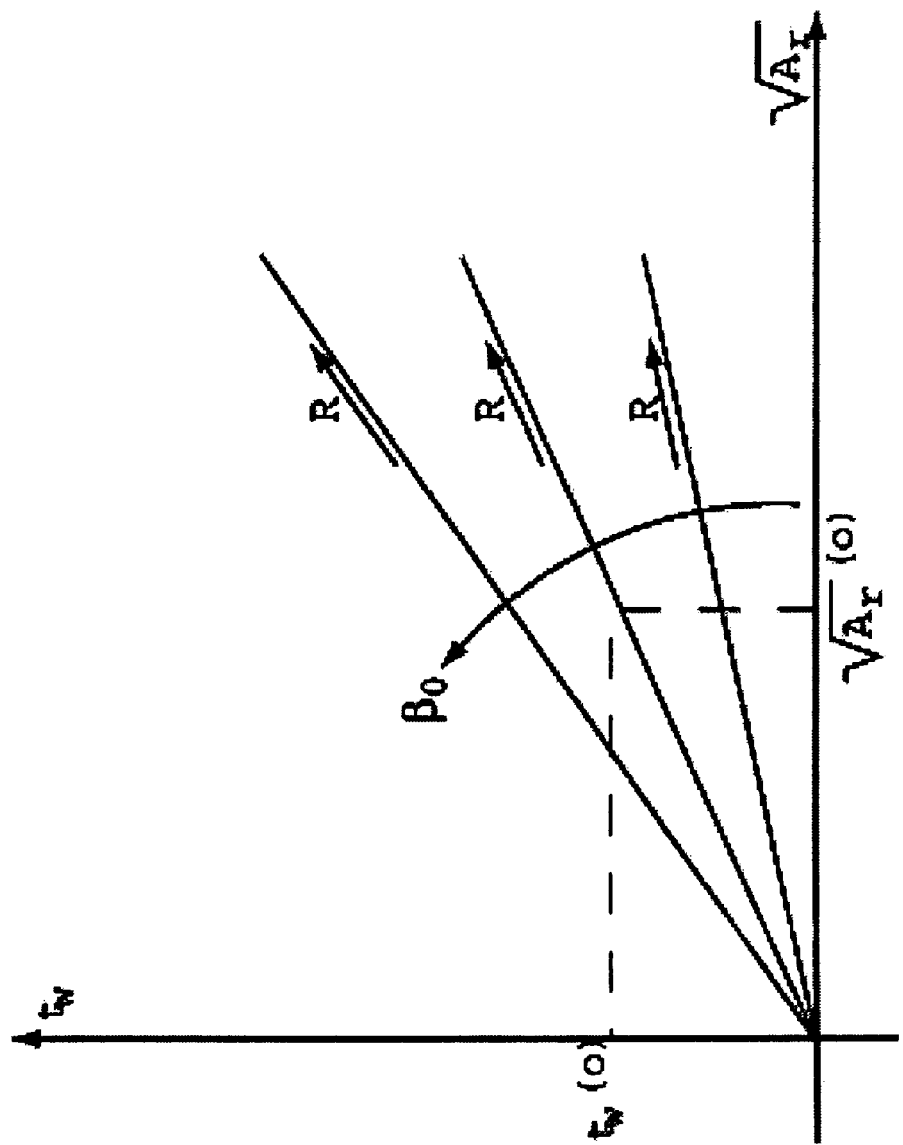
Figure 27:
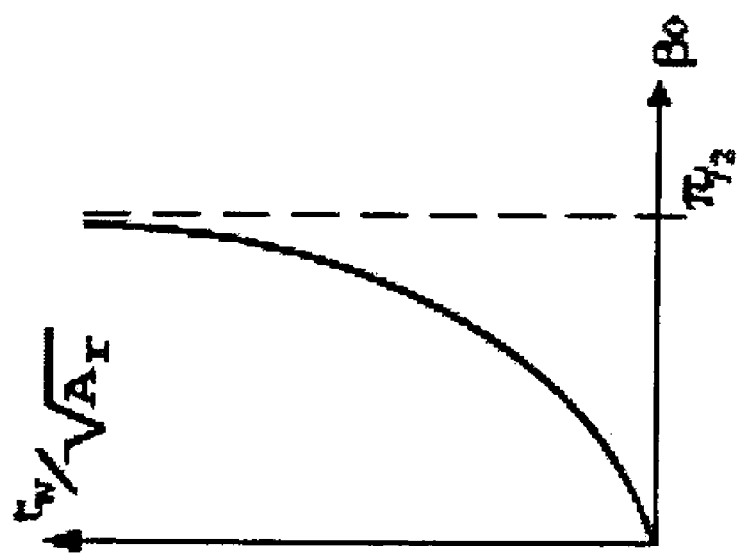

We see that, from Equations (21) and (29), we have $$t_w = \frac{\beta_0 R}{V} = aR \tag{32}$$

where a is proportionally constant, and $$A_r = \frac{R^2}{2}f(\beta_0) = b^2 R^2 \tag{33}$$

where, $f(\beta_0)$ is determined by Equation (29). Eliminating R-value from these equations, we obtain $$\frac{t_w}{\sqrt{A_r}} = \frac{a}{b} = \frac{\beta_0}{\sqrt{\frac{f(\beta_0)}{2}}} \tag{34}$$

which is illustrated in FIGS. 26 and 27.

We see that in order to increase $t_w(o)$ value, for fixed R, we need indeed to increase $\beta_0$-value, as in Table 1. On the other hand, for larger $\beta_0$-values (required for larger surface reliefs), we need to increase R-value in order to accommodate larger $t_w$-values, while to preserve also reasonable large $\sqrt{A_r}$-values.

Having thus disclosed preferred embodiments of the present invention, it will be understood that various modifications and additions are contemplated. Accordingly, the scope hereof is to be limited only by the claims appended hereto and their equivalents.

What is claimed is:

1. A method for replicating three dimensional microstructures from a master pattern of microstructures onto a continuous rolling substrate band of a flexible planar material having a width, an image surface, which was coated with curable coating liquid, and a reverse surface comprising the steps of:
    providing an apparatus comprising an image drum having said master pattern of microstructures on a peripheral surface, an idler roll, a nip roll positioned in proximate parallel relation to said image drum, a source of ultraviolet radiation;
    transferring the continuous rolling substrate band of flexible planar material around said idler roll;
    bringing the image surface of the flexible planar material to the peripheral surface of the image drum at an entry point;
    providing a puddle of curable coating liquid between and in contact with the image surface and the peripheral surface of the image drum at the location of the entry point;
    applying pressure to the reverse surface of the flexible planar material across the width thereof to penetrate the coating liquid between the image surface and the peripheral surface of the image drum into the microstructures of the peripheral surface of the image drum,
    wherein the pressure at the nip roll is $p=(T/lr)=(T_{entry}e^{-/\theta}lr)$, where p is the pressure, T is an actuation force, l is a length of the image drum, r is a radius of the image drum, and $\theta$ is a selected angle in the direction of motion to the image drum;
    substantially curing the coating liquid prior to the image surface reaching an exit point and retaining on the image surface an impression of the microstructures on the peripheral surface of the image drum; and
    separating the substantially cured coating liquid on the image surface of the flexible planar material from the peripheral surface of the image drum at the exit point.

2. The method of claim 1, wherein the continuous rolling substrate band is wrapped on the image drum through the selected angle from 5 degree to 70 degree prior to reaching said nip roll.

3. The method of claim 2, wherein the continuous rolling substrate band is wrapped on the image drum through the selected angle exceeding 90 degree beyond said nip roll.

* * * * *

UNITED STATES PATENT AND TRADEMARK OFFICE
CERTIFICATE OF CORRECTION

| | | |
|---|---|---|
| PATENT NO. | : 8,114,248 B2 | Page 1 of 1 |
| APPLICATION NO. | : 11/649428 | |
| DATED | : February 14, 2012 | |
| INVENTOR(S) | : Kang Lee et al. | |

It is certified that error appears in the above-identified patent and that said Letters Patent is hereby corrected as shown below:

<u>Column 16, Claim 1:</u>

Lines 25-26, the equation should read:

$p = (T/lr) = (T_{entry}e^{-f\theta}/lr)$

Signed and Sealed this
Twenty-fifth Day of December, 2012

David J. Kappos
*Director of the United States Patent and Trademark Office*